(12) United States Patent
Sachs et al.

(10) Patent No.: US 7,990,600 B2
(45) Date of Patent: Aug. 2, 2011

(54) TRANSMISSIVE, OPTICALLY ADDRESSED, PHOTOSENSITIVE SPATIAL LIGHT MODULATORS AND COLOR DISPLAY SYSTEMS INCORPORATING SAME

(75) Inventors: Jonathan A. Sachs, Vancouver, WA (US); Howard V. Goetz, Tigard, OR (US); David Keith, Vancouver, WA (US); Lin Li, St. Petersburg, FL (US); Steven H. Linn, Hillsboro, OR (US); Alexander Parfenov, Rancho Palos Verdes, CA (US); Stephen E. Brice, Portland, OR (US); Terry J. Scheffer, Hilo, HI (US); James A. Van Vechten, Corvallis, OR (US); Jiuzhi Xue, Broomfield, CO (US)

(73) Assignee: Compound Photonics Limited, Phoenix, AZ (US)

( * ) Notice: Subject to any disclaimer, the term of this patent is extended or adjusted under 35 U.S.C. 154(b) by 861 days.

(21) Appl. No.: 11/569,498

(22) PCT Filed: May 24, 2005

(86) PCT No.: PCT/US2005/018305
§ 371 (c)(1),
(2), (4) Date: Jan. 24, 2008

(87) PCT Pub. No.: WO2005/116719
PCT Pub. Date: Dec. 8, 2005

(65) Prior Publication Data
US 2008/0239458 A1    Oct. 2, 2008

Related U.S. Application Data

(60) Provisional application No. 60/574,237, filed on May 24, 2004.

(51) Int. Cl.
*G02F 1/03* (2006.01)
(52) U.S. Cl. .......................................... 359/241; 359/244
(58) Field of Classification Search .................. 359/238, 359/241, 242, 243, 244
See application file for complete search history.

(56) References Cited

U.S. PATENT DOCUMENTS

| 2003/0081304 A1 | 5/2003 | Harada et al. | 359/294 |
| 2008/0211836 A1* | 9/2008 | Stanley et al. | 345/694 |

* cited by examiner

*Primary Examiner* — Timothy J Thompson
(74) *Attorney, Agent, or Firm* — McKenna Long & Aldridge, LLP.

(57) ABSTRACT

An optically addressed, photoconductive spatial light modulator (SLM) operates in a transmissive mode and is capable of modulating a wide spectrum of visible light. There is no pixel structure or native pixel resolution in the SLM. The SLM has no photodiodes and does not rectify. A light projection system (100) in which one or more SLMs (128, 130, 132) are placed includes a write (image definition) UV light path (102) and a read (illumination) visible light path (104) to form a color image projection display. The write UV light propagates from an image display pattern source (120) and either sequentially or continuously writes image patterns on the photoconductive SLMs. The read visible light propagates through the SLM and is modulated by an electro-optical material, the optical properties of which change in response to the image structure carried by the write light. The result is a high efficiency display system that delivers high resolution color images through a projection lens (190) onto a display screen.

73 Claims, 31 Drawing Sheets

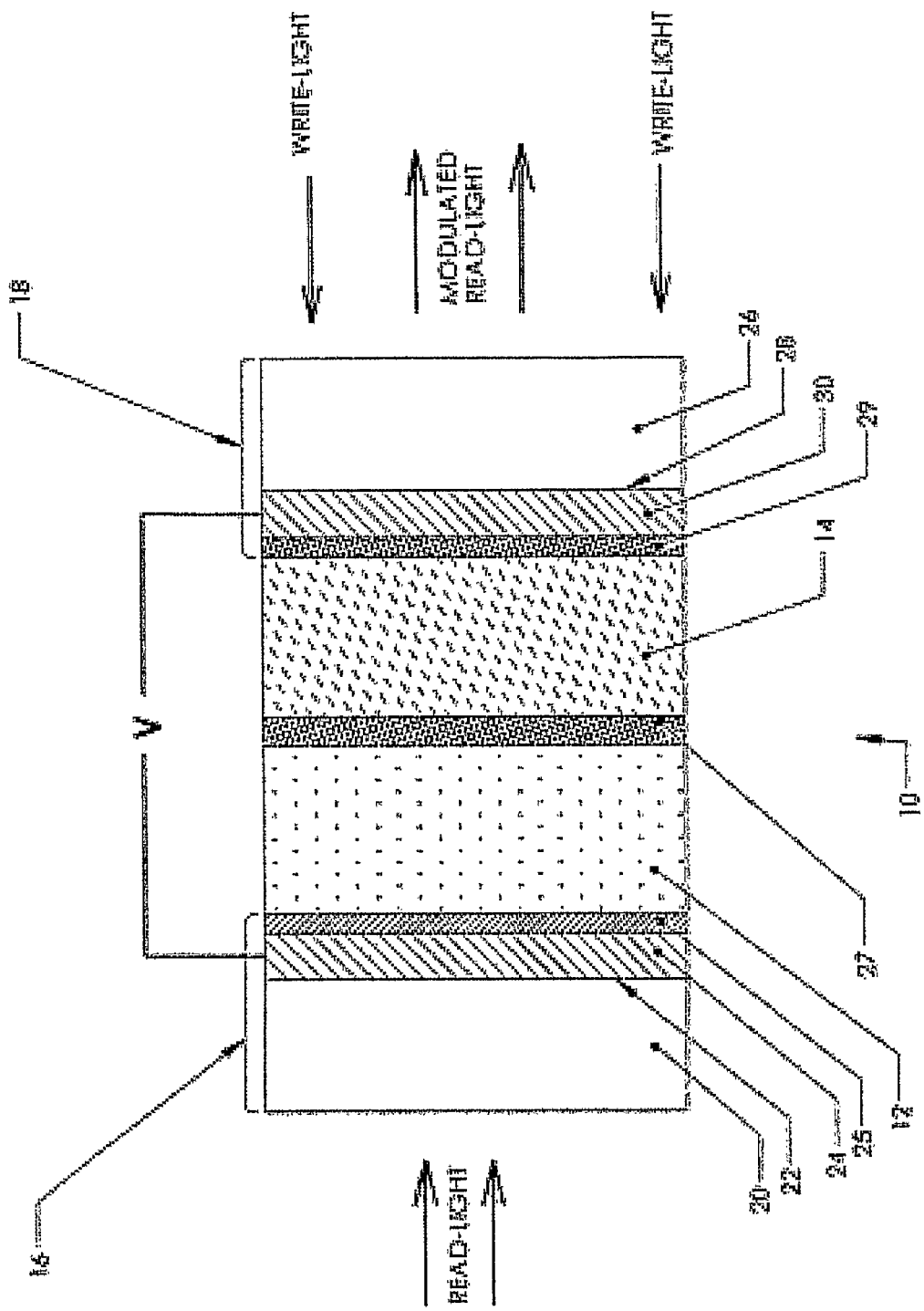

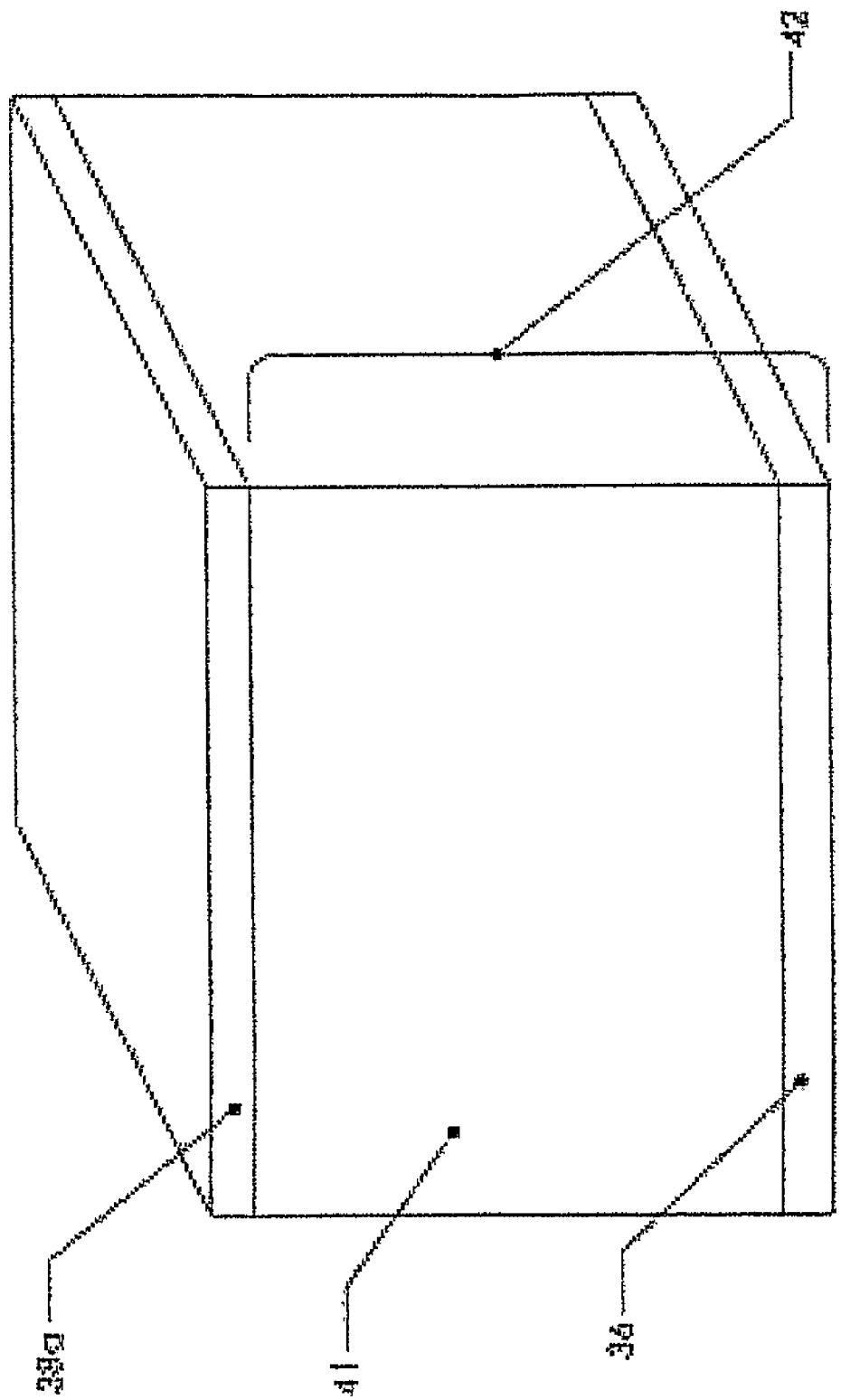

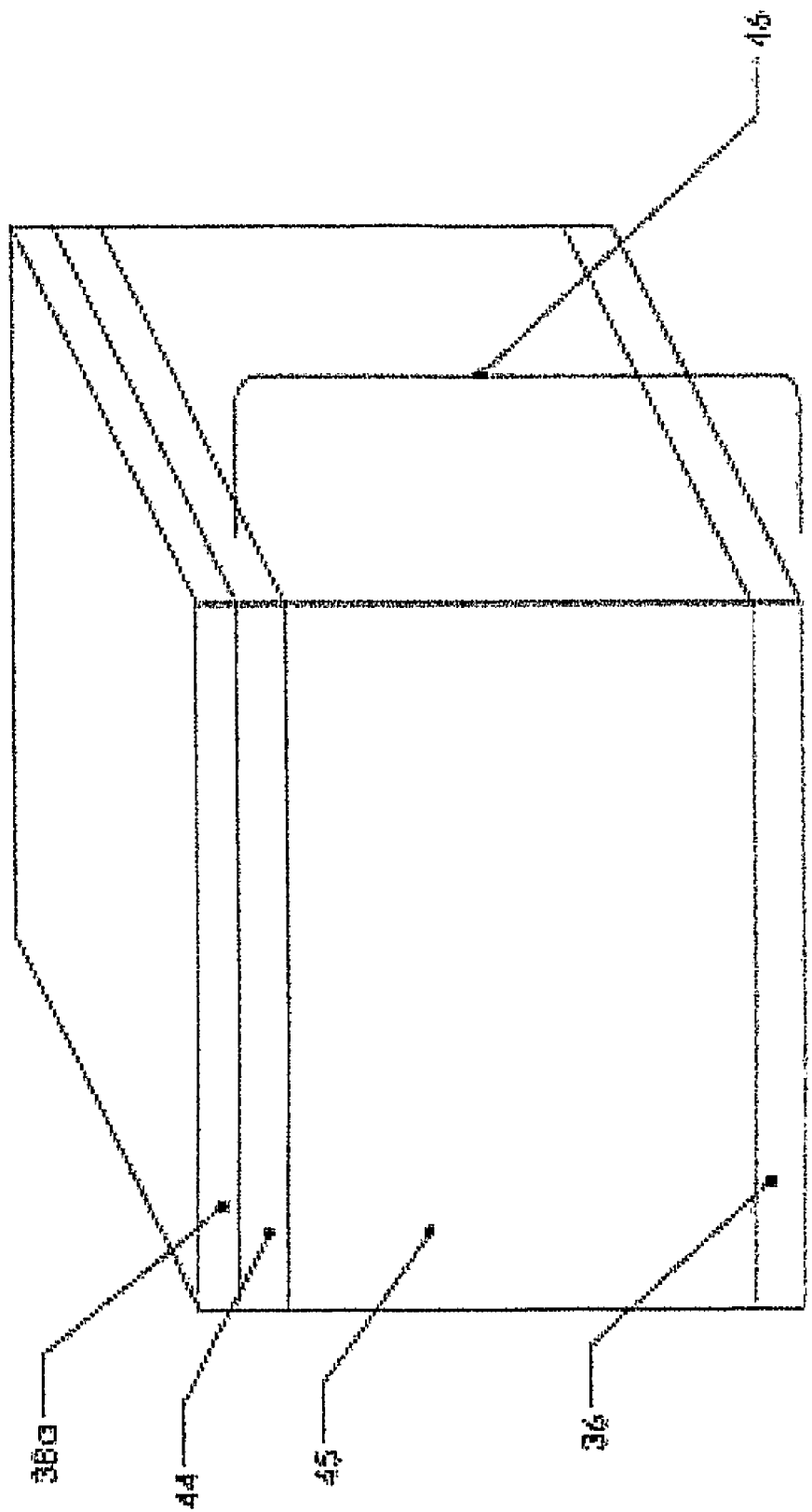

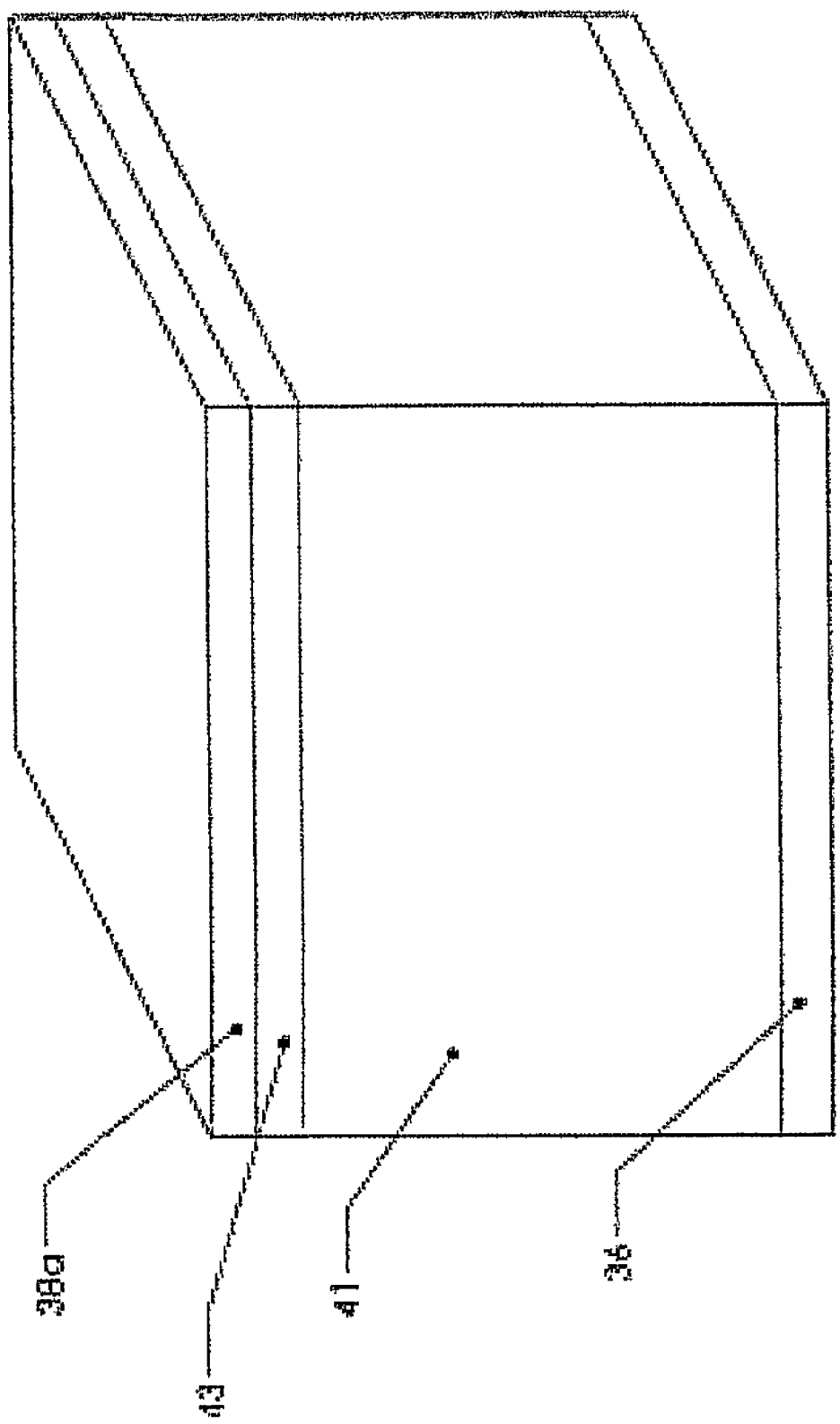

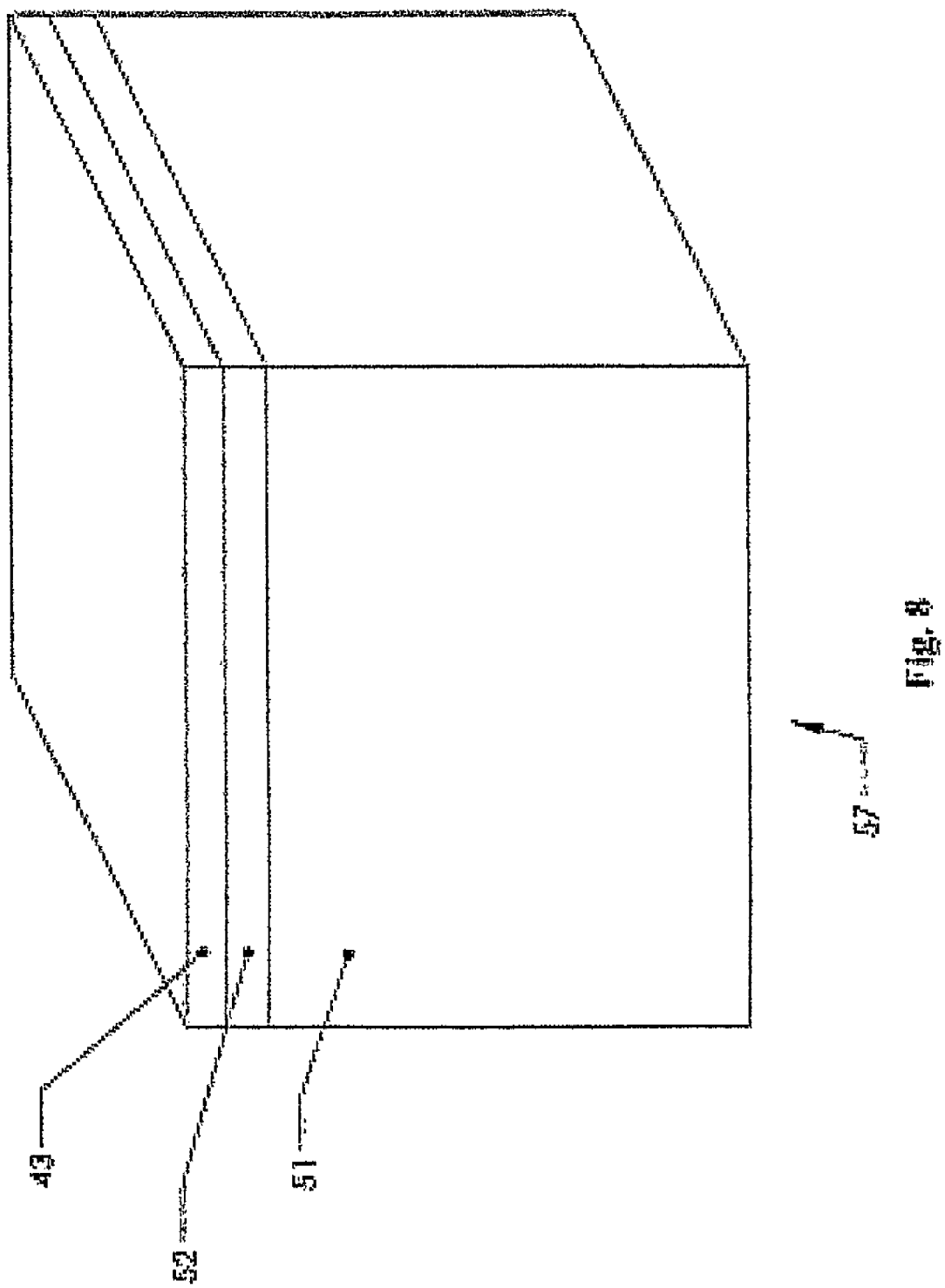

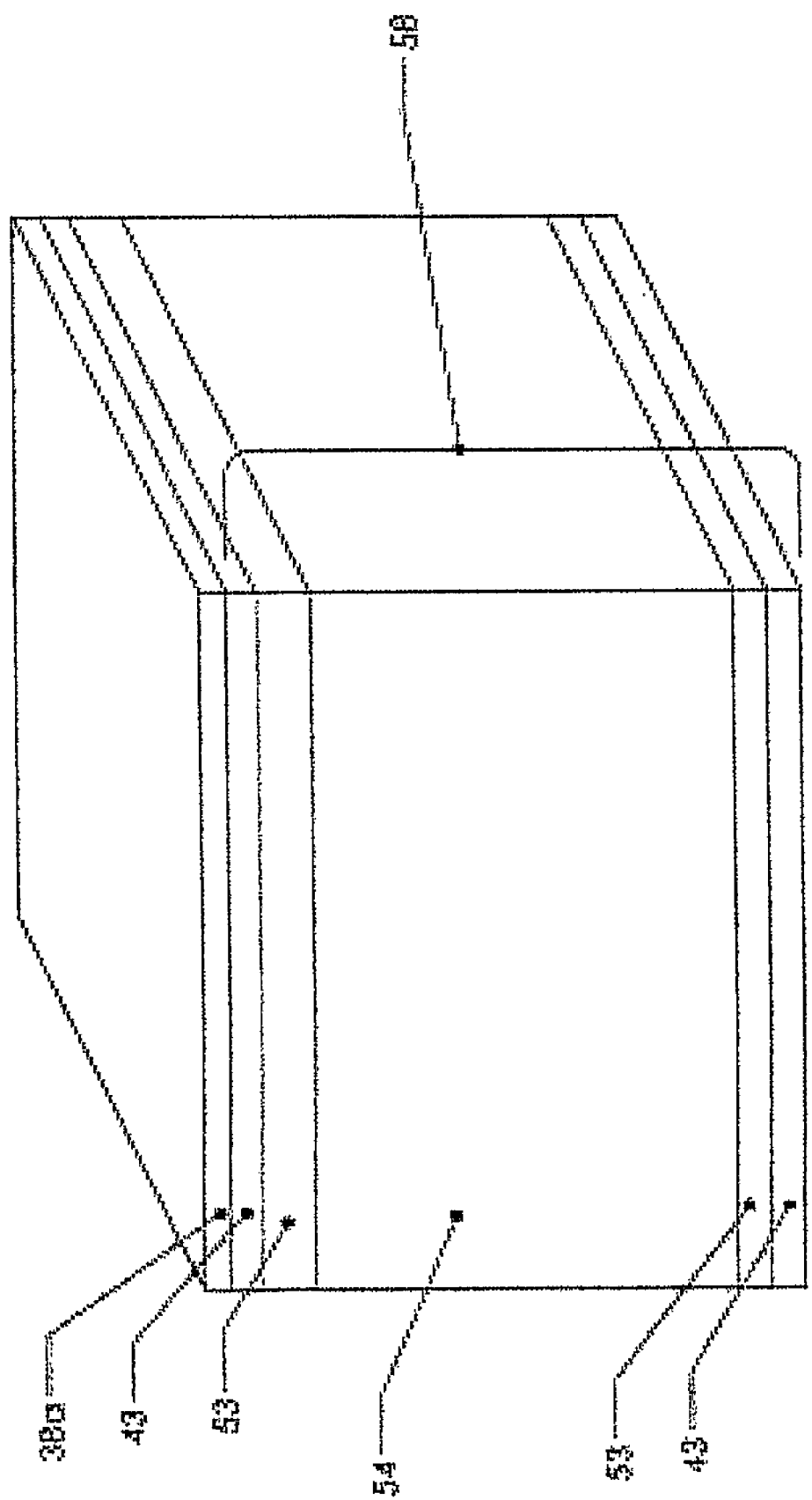

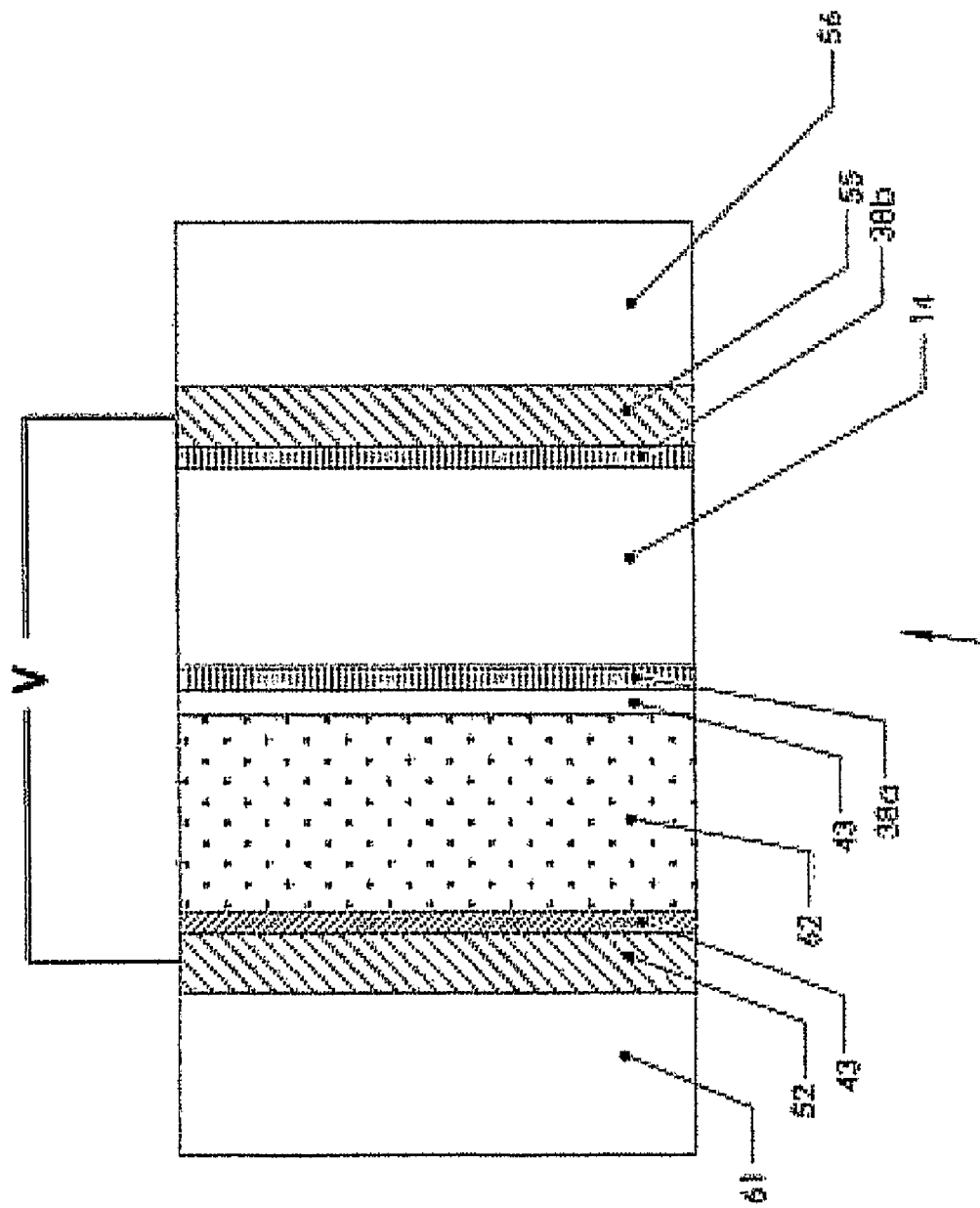

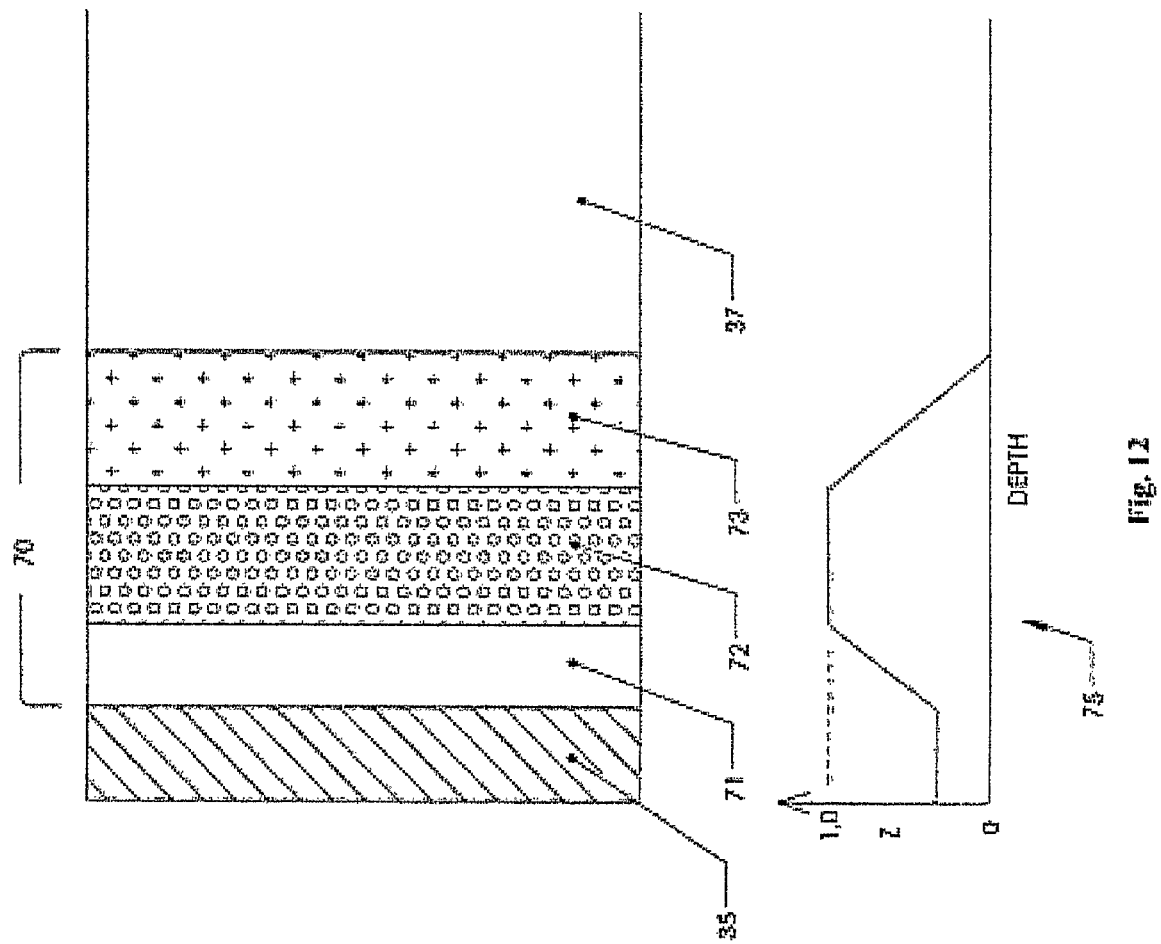

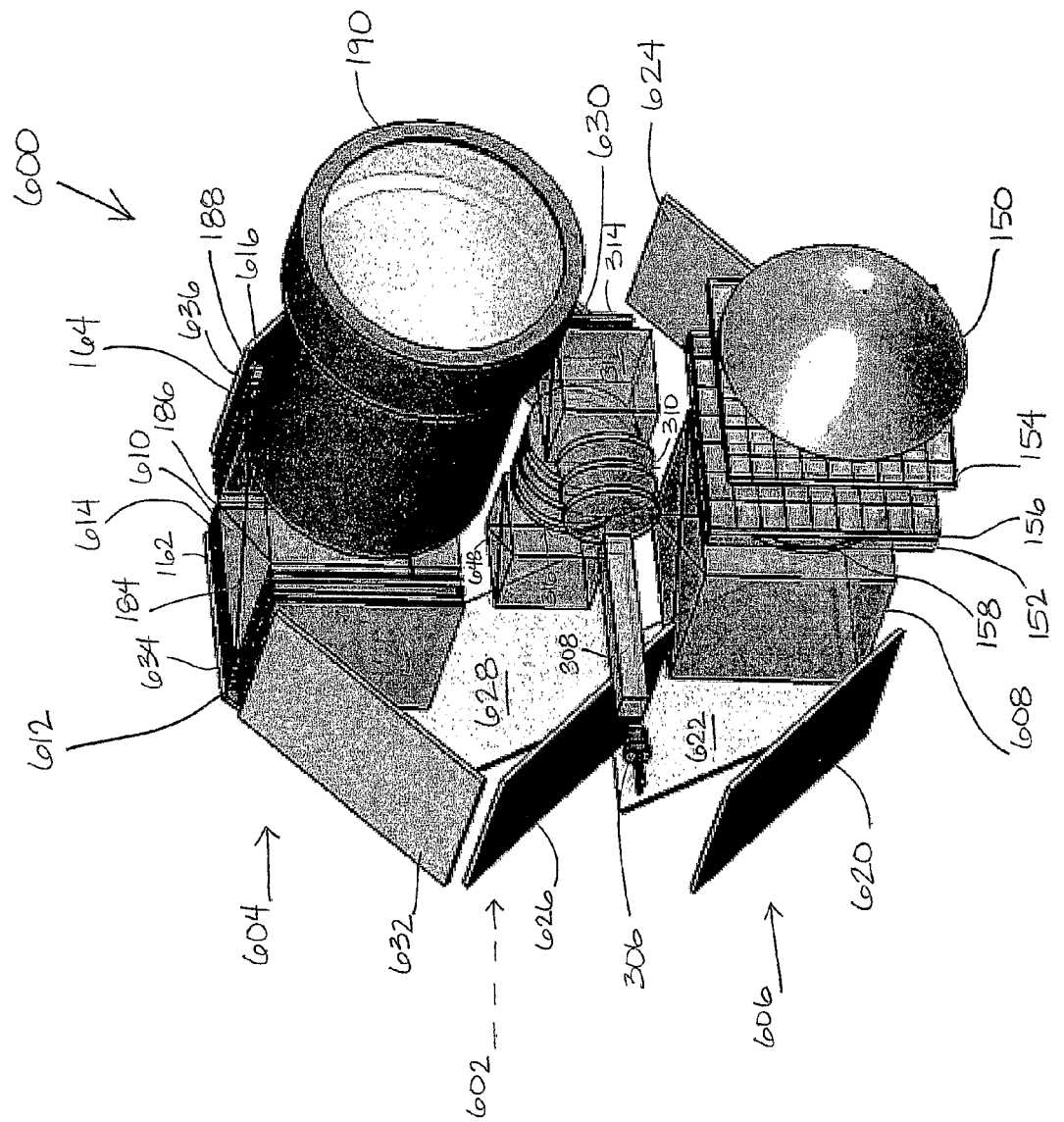

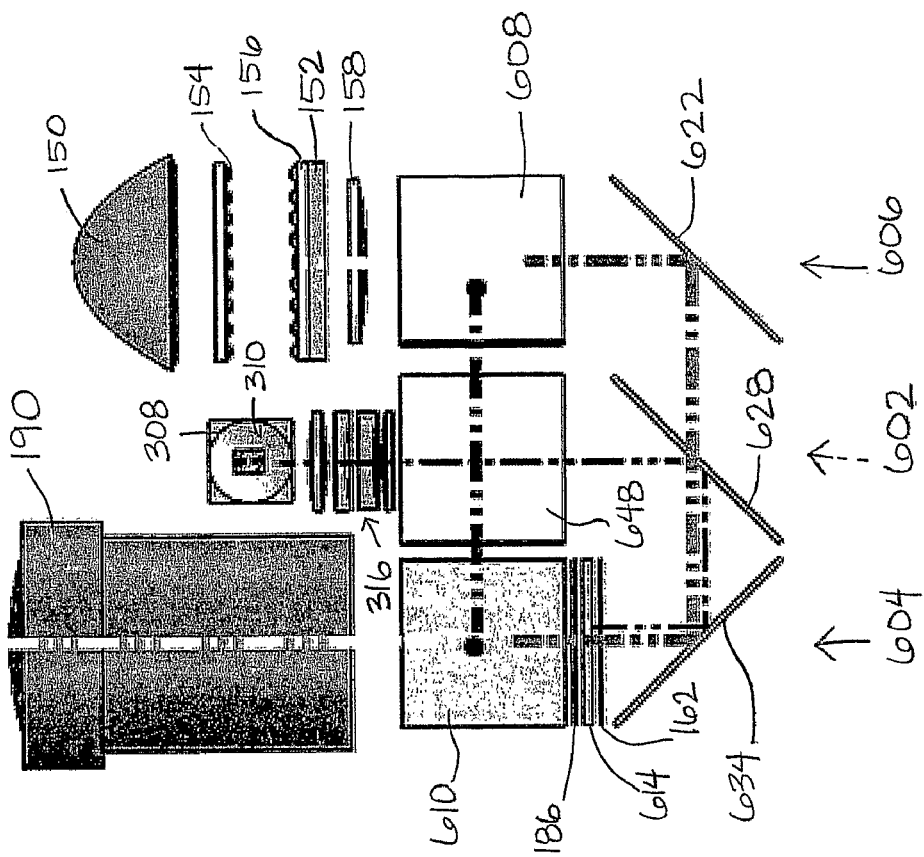
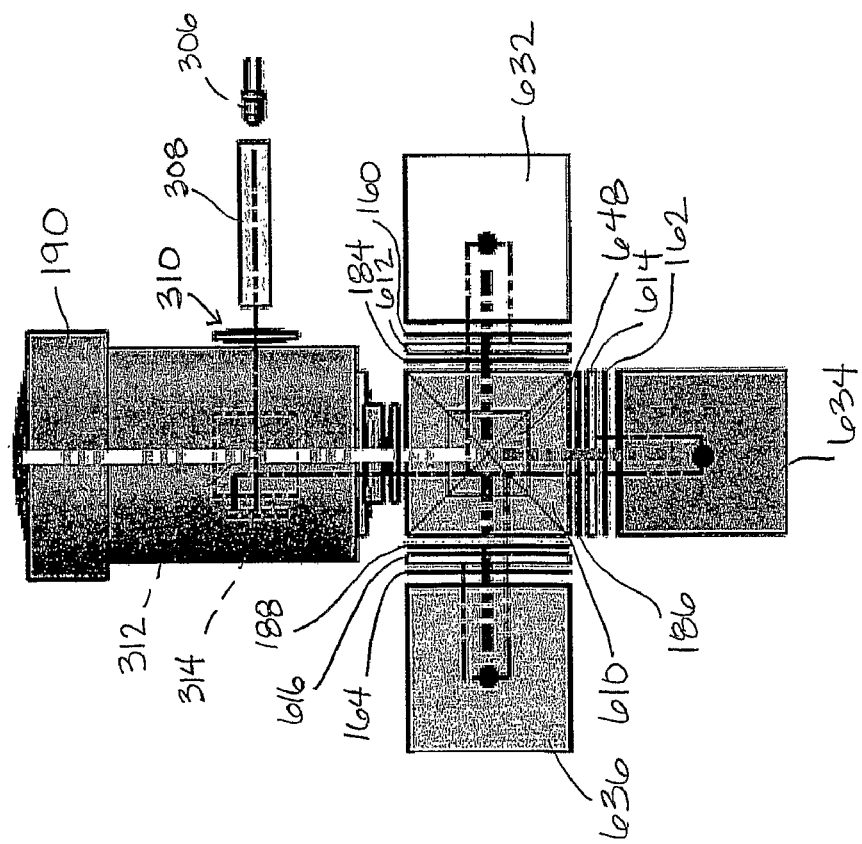
Fig. 18C
Fig. 18B

TRANSMISSIVE, OPTICALLY ADDRESSED, PHOTOSENSITIVE SPATIAL LIGHT MODULATORS AND COLOR DISPLAY SYSTEMS INCORPORATING SAME

RELATED APPLICATION

This application claims benefit of U.S. Provisional Patent Application No. 60/574,237, filed May 24, 2004.

COPYRIGHT NOTICE

© 2005 Steridian Corporation. A portion of the disclosure of this patent document contains material that is subject to copyright protection. The copyright owner has no objection to the facsimile reproduction by anyone of the patent document or the patent disclosure, as it appears in the Patent and Trademark Office patent file or records, but otherwise reserves all copyright rights whatsoever. 37 CFR §1.71(d).

TECHNICAL FIELD

This invention relates to optically addressed spatial light modulators and, in particular, to transmissive, optically addressed, photoconductive spatial light modulators and to color display systems incorporating them.

BACKGROUND OF THE INVENTION

Optically addressed photoconductive light valves or spatial light modulators (SLMs) enable spatial modulation of light beams incident to them. Spatial modulation of a light beam entails changing the optical properties of the light valve, such as the intensity or phase of the light wave. Popular examples of an SLM are liquid crystal displays (LCDs), which convert image data stored in an electronic medium into a visible picture or an image. Spatial modulation of light incident on an LCD is performed by producing changes in the optical properties of a liquid crystal layer in response to an array of applied electrical voltages, the values of which can vary in time to produce a moving picture or otherwise alter the image. These changes are in the prior art introduced locally by supplying potential differences at different points across the liquid crystal layer by means of an electrode array system in contact with or proximal to a liquid crystal layer.

An alternative approach to performing spatial light modulation that eliminates the expense of the electrode array light modulation is represented by the technology implemented in optically addressed light valves or SLMs. The optically addressed SLM responds to an optical signal that causes local changes in optical properties of an electro-optic material, e.g., a layer of liquid crystal, to produce an output image. Prior art optically addressed spatial light modulators contain a liquid crystal or other electro-optic material layer and a photoconductive layer formed usually of semiconductor material. The semiconductor material for the photoconductors in prior art light valves have been selected from a variety of materials that absorb light in at least a portion of the range (400 nm-700 nm) of visible wavelengths and include, for example, single crystal silicon (Si), amorphous Si, amorphous silicon carbide, gallium arsenide (GaAs), $Bi_{12}SiO_{20}$, zinc sulfide (ZnS), and cadmium sulfide (CdS). Almost all of these prior art structures operate in a reflection mode so that the visible readout or illumination light that is modulated by the SLM does not reach the photoconductive layer because at least a portion of the visible spectrum would be heavily absorbed in the photoconductive layer and a good full color image could not be obtained.

There are advantages for the optical engine of a display system to be able to operate the light valves in the transmissive mode. Several devices that use near infrared "read light" have been developed. Monochromatic transmissive displays that use red read light and green or blue write light have been demonstrated with ferroelectric liquid crystals. Ferroelectric liquid crystals are inherently bistable, which makes the attainment of a large range of intensity or gray scale difficult. For a large image, full color display with a fine gray scale, there has long been a need for an optically addressed spatial light modulator that operates in a transmissive mode with a non-ferroelectric liquid crystal and is capable of modulating substantially all of the spectrum of visible light to form an image. An advantage of such a spatial light modulator is that projector light engines using transmissive light valves are cheaper and simpler to make.

SUMMARY OF THE INVENTION

The object of the present invention is to provide an energy efficient, fine gray scale, full-color, high-brightness, high-definition, large-screen, long-lived, moving-picture projection display system in multiple formats that can be manufactured at low cost. This objective is achieved by provision, in the projection display system, transmission-mode optically addressed, spatial light modulators (OASLMs) that can modulate read light beams substantially spanning the visible spectrum, can be written with available and inexpensive ultraviolet write light sources, can switch sufficiently fast to avoid perceptible image lag and image ghosting, and require no pixilation, thereby avoiding expense and inter-pixel obscuration. An advantage of the invention is that it allows the display to change electronically the pixilation format of the image it presents, e.g., from NTSC to HDTV, according to the nature of the input signal, with no exchange or reconfiguration of hardware. The transmission-mode OASLM is implemented with a light valve structure that does not absorb too much of the various read light beams, uses a nematic liquid crystal that allows a fine gray scale, is more energy efficient than corresponding OASLMs that use ferroelectric type liquid crystals, and is incorporated in a novel optical engine.

Preferred embodiments of the invention implement a light projection display system using one or more optically addressed spatial light modulator (OASLM) read valves that operate in a transmissive mode and are individually or collectively capable of modulating a wide spectrum of visible read light, as well as sources of the read light and the optical engine. Some of the preferred embodiments of the invention use one or more electrically addressed write valve SLMs of the type known as liquid crystal on silicon (LCoS) as well as sources of the write light. Other preferred embodiments use electrically addressed write valve SLMs of the types known as amorphous silicon or polycrystalline silicon thin-film transistor (TFT) displays as well as sources of the write light. Another preferred embodiment uses a digital mirror as the write light valve as well as sources of the write light. Still other of the preferred embodiments use devices chosen from the group of cathode ray tubes (CRTs), field effect display (FED) devices, inorganic light emitting diode (LED) arrays, organic light emitting diode (OLED) arrays, and plasma displays that both provide the write light and impose the modulation of its intensity required to write the proper pattern into the read valve OASLMs together with a simpler optical engine.

Each read valve OASLM absorbs most of the write light, which is used to define the portion of the image that is rendered in the corresponding color of read light, within a photoconductive structure. Each read valve OASLM passes most of the read light (visible illumination light) through the same photoconductive structure that absorbs the corresponding write light. (Some absorption and reflection is unavoidable but undesired.) Each read valve OASLM also passes most of its read light through a nematic liquid crystal structure, in which the polarization state of the read light is modulated by the local state of the liquid crystal according to the local value of the electric field across the liquid crystal. The series combination of the photoconductor structure and the nematic liquid crystal structure forms a sandwich that is positioned between electrode structures on either side of the sandwich. The local value of the electric field is determined by the total electric field applied by the electrode structures across the sandwich and by the local value of the fraction of this total voltage that falls across the photoconductive structure, which is affected by the local amount of the photocurrent of electrons and holes that the write light has excited in each local region. There is no pixel structure or native pixel resolution in any of the read valve OASLMs. Thus, changing the pixilation format entails changing the pixilation format of the write light pattern going into the read valve OASLMs.

Because the photoconductive structure absorbs most of the write light and transmits most of the read light, the bands of wavelengths of light used for the two beams for each read valve OASLM are substantially non-overlapping. In preferred embodiments, wavelengths in the band of wavelengths of write light are shorter than those in the band of wavelengths of the corresponding read light in each read valve OASLM. The read light must not erase the pattern written by the write light, even though the photon flux (i.e., integrated power) of the read light is predominant over that of the write light. For preferred embodiments that use violet read light, the corresponding write light is in the ultraviolet (UV) range of the electromagnetic spectrum. Thus, read valve OASLMs for blue and violet read light require photoconductive materials that transmit blue light but absorb UV light to produce sufficient photoconductivity. The photoconductive materials of the prior art do not meet this requirement for blue read valves operating in a transmissive mode. Although it mentioned the possibility of a transmissive mode full color display and suggested that an OASLM might use ZnS as the photoconductive material, U.S. Pat. No. 3,824,002, neither taught nor provided a drawing figure of such a device. Moreover, there is no available supply of ZnS that is sufficiently transparent for blue light to make a practical full color projection display device. Specifically, the photocurrent across the photoconductive structure of the OASLM produced by a unit of blue light energy at a wavelength of about 420 nm would be approximately 1,000 times less than the corresponding photocurrent produced by unit of ultraviolet light energy at a practical wavelength of about 370 nm.

It is well known that liquid crystal cells degrade over time if they are subjected to long-time sustained DC electrical bias of greater than about 0.1 V. Therefore, display devices using liquid crystal cells in OASLMs and intended for long service lives should not be implemented with OASLM structures that rectify to any substantial degree the AC voltage signals applied to them. For the same reason, the photoconductive structures with the OASLMs should not be implemented to act as photodiodes.

For those embodiments in which the source of write light is separate from the write light valve that imposes the pattern in its intensity, the write light propagates from a write light source to a write valve SLM that modulates it according to electronic signals coming from an electronic data system to begin the image definition process of the display. The modulated write light from each write valve propagates further to a read valve SLM, where it controls the modulation of the corresponding beam of read light, as just described above. In various preferred embodiments, the write valve SLM is chosen from the group of possible components that includes an electrode array type SLM, such as a liquid crystal-on-silicon (LCoS) or a thin film transistor (TFT) array device; a digital mirror array; and an OASLM written by an electro-optically steered, focused beam of light of a band of wavelength and operating in either the reflection mode or the transmission mode. If operating in the transmission mode, the light that writes this write valve substantially non-overlaps the band of write light for that OASLM and is absorbed in the photoconductor of that OASLM while the write light that is modulated therein is not substantially absorbed in the photoconductor. After passing through the read valve SLM, the intensity of the visible read light is modulated by a linear polarization filter (or other technique known in the art) in accordance with the two-dimensional pattern that was imposed by the write light and is then projected as an image onto a display screen, either from the front or from the rear.

For those embodiments in which the same device, chosen from the class of CRTs, FEDs, plasma displays, LED arrays, and OLED arrays, that is the source of the write light and the author of its intensity pattern, a lens system focuses this pattern onto the appropriate OASLM read valve. The patterned light is absorbed in the photoconductive structure of the OASLM read valve, as it is also in the other class of embodiments.

It is possible to practice the present invention with one read valve, one write valve, one write light source, and multiple read light sources to produce a color image by presenting the various color portions of the full image sequentially. Human beings viewing such a presentation tend, however, to perceive "color break-up," which is displeasing. Therefore, preferred embodiments of the present invention use one read valve OASLM for each color of read light and multiple color portions of the image are presented at the same time. In some preferred embodiments, the color portions of the image are presented continuously, even while the read valve OASLM is erasing or rewriting its color portion of the image. In other preferred embodiments, the read light is turned off while the corresponding read valve OASLM is erasing or rewriting its color portion of the image.

It is possible to practice the present invention with one write light source and one write light valve for each of a multiplicity of read valve OASLMs, but it may be more economical to use one write light valve to control multiple read value SLMs by writing them sequentially (hereafter, in a "color field sequential manner"). Color field sequential operation is made possible by the charge integration property of the photoconductive structure in the read valve OASLM. Specifically, the OASLM integrates the charge developed by the photocurrent produced locally according to the local write light intensity and then holds most of that charge until the bias voltage across the combination of photoconductive structure and nematic liquid crystal structure is reversed or driven approximately to zero to prepare for the writing of the next frame. Thus, the previous light state persists in each of the read valves until a new duty cycle begins for each of the write valves, and perhaps longer depending upon the rise time and the fall time of the liquid crystal material.

In various preferred embodiments, the read light sources are high intensity discharge (HID) lamps with color filters, high intensity LEDs, or gangs of LEDs with an optical integrating device. In various preferred embodiments, the write light sources are lamps, discrete LEDs, or multiple LEDs located in the same package. For the color displays, at least some of the write light source lamps or LEDs emit in the UV range.

The optical engines for the various preferred embodiments use dichroic coatings to provide beamsplitters and beam combiners to control the various read light beams and write light beams in manners that are illustrated in the various drawing figures herein provided.

Additional aspects and advantages will be apparent from the following detailed description of preferred embodiments, which proceeds with reference to the accompanying drawings.

BRIEF DESCRIPTION OF THE DRAWINGS

FIGS. 1A, 1B, 1C, and 1D depict a general transmissive, photoconductive optically addressed spatial light modulator (OASLM) structure. In FIG. 1A, both the read light and the write light enter from the side of the photoconductive structure and the read light exits from the side of the liquid crystal structure. In FIG. 1B, both the read light and the write light enter from the side of the liquid crystal structure. In FIG. 1C, the read light enters from the side of the photoconductive structure and the write light enters from the side of the liquid crystal structure. In FIG. 1D, the read light enters from the side of the liquid crystal structure and the write light enters from the side of the photoconductive structure.

FIG. 2 is a transmissive, photoconductive OASLM using GaN alloys.

FIG. 5A is a diagram of one embodiment of a photoconductive structure for a transmissive, photoconductive OASLM that uses not-intentionally doped GaN as a photoconductor. FIG. 5B differs from FIG. 5A only by the addition of a thin write light absorption layer formed by alloying 2% InN into the GaN and by alloying 5% Al into the GaN in the broad region between this absorption layer and the electrical isolation layer.

FIG. 6 is a diagram of one embodiment of a photoconductive structure for a transmissive, photoconductive OASLM using not-intentionally doped GaN that has an amorphous electrically insulating layer between the photoconduction layer and the alignment layer for the liquid crystal.

FIG. 8 is a diagram of one embodiment of a photoconductive-side electrode structure for a transmissive, photoconductive OASLM that uses ZnO alloys.

FIG. 9 is a diagram of one embodiment of a photoconductive structure for a transmissive, photoconductive OASLM that uses ZnO alloys as a photoconductor.

FIG. 10 is a diagram of one embodiment of a photoconductive OASLM using amorphous alloys of a-SiC$_x$:H for a photoconductor.

FIG. 12 is a diagram of a graded alloy composition dielectric structure that suppresses photoemission of carriers from the photoconductor side electrode into the photoconductor for the particular case in which p-type GaN is the photoconductive material. The variation of the alloying z parameter of the $Al_zGa_{1-z}N$ alloy as a function of depth is plotted below the layer diagram.

FIGS. 13, 14A, 14B, 15, 16A, 17A, 17B, 18A, 18B, and 18C are diagrams of projector light engines in which the preferred spatial light modulators may be incorporated.

DETAILED DESCRIPTION OF PREFERRED EMBODIMENTS

Figure 1A:
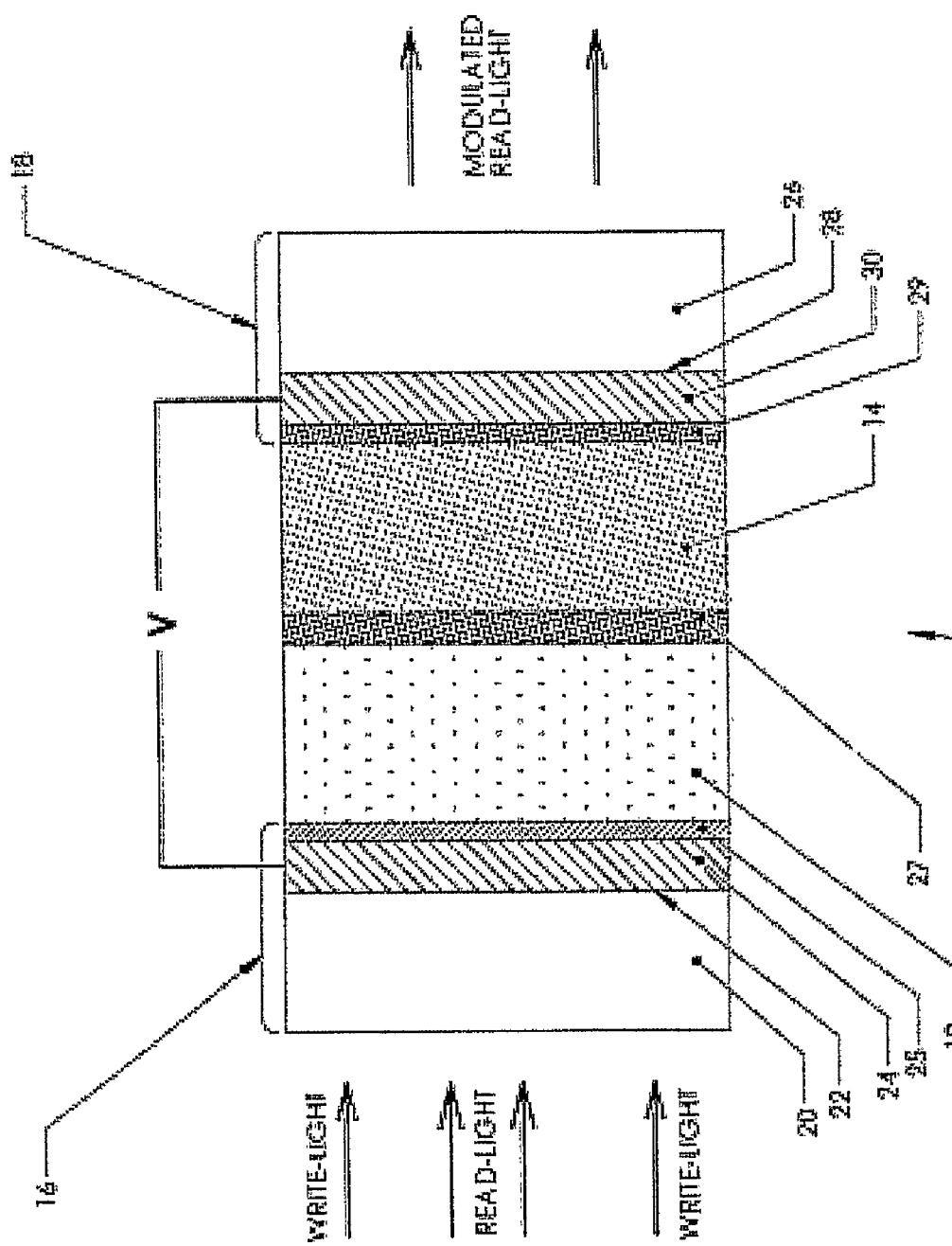

FIGS. 1A, 1B, 1C, 1D, and 1E show preferred embodiments of a transmissive, photoconductive optically addressed spatial light modulator (OASLM) 10, differing according to the direction from which the read light and the write light enter the OASLM structure and as yet nonspecific as to the choices of compositions of the various layers of material.

With reference to FIGS. 1A, 1B, 1C, and 1D, OASLM 10 includes a photoconductive material structure 12, which absorbs the write light so much more strongly than any of the read light beams directed into to it that the amount of photocurrent produced therein in response to a unit of photo-energy at the write light wavelength is preferably at least 1,000 times greater than the amount of photocurrent produced therein in response to a unit of photo-energy at any read light wavelength, and a liquid crystal light modulating structure 14 positioned between electrode structures 16 (on the photoconductor side) and 18 (on the liquid crystal side). Electrode structures 16 and 18 are substantially optically transparent for all read light wavelengths and, if the write light is to enter at their sides, they are also substantially optically transparent for write light wavelengths at the operating temperature of a projection display device in which OASLM 10 is installed. Electrode structure 16 is formed of an optically transparent substrate 20 having an inner major surface 22 covered by an optically transparent, electrically conductive material or electrode layer 24, and electrode structure 18 is formed of an optically transparent substrate 26 having an inner major surface 28 covered by an optically transparent, electrically conductive material or electrode layer 30.

Figure 1B:
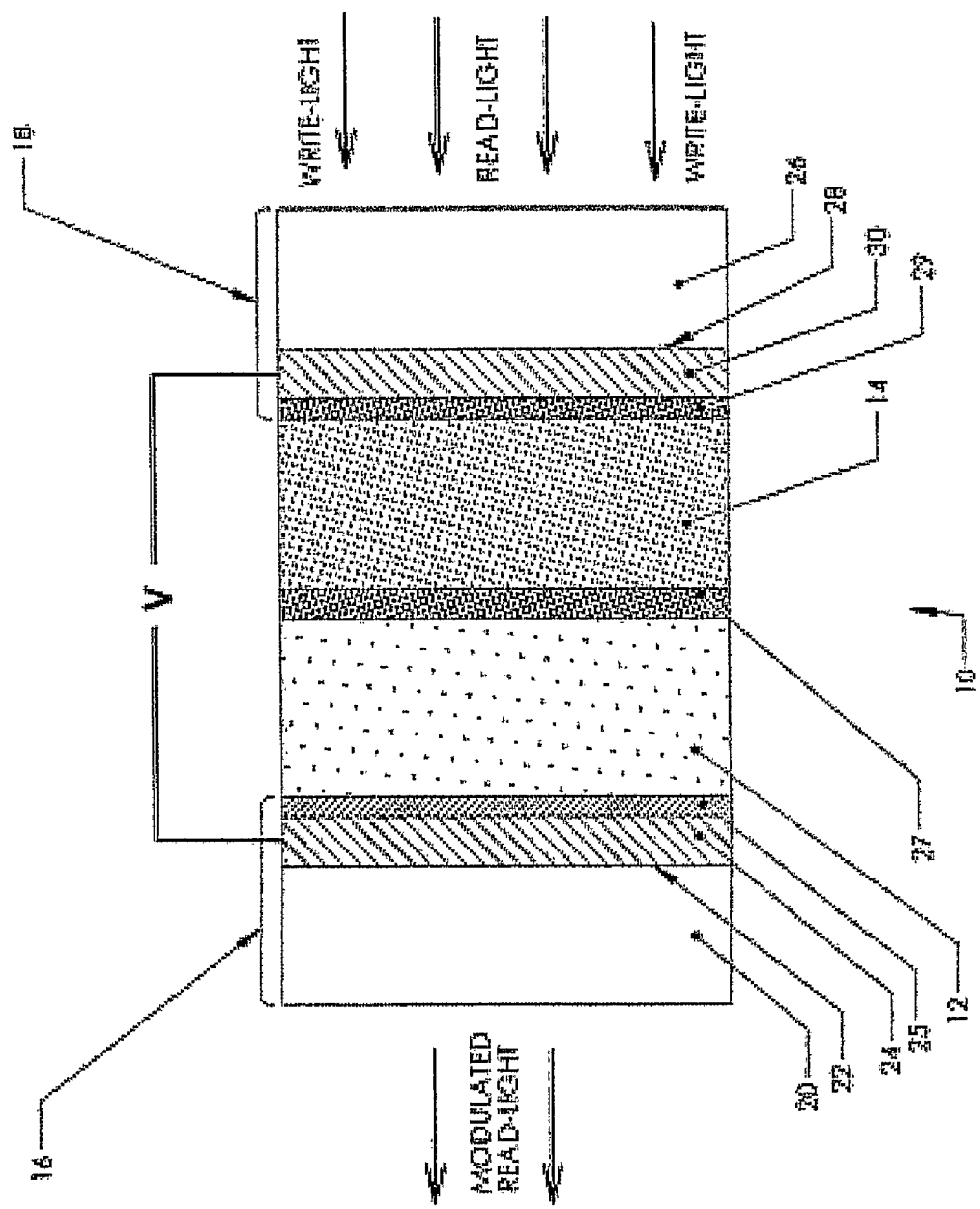
Figure 1D:
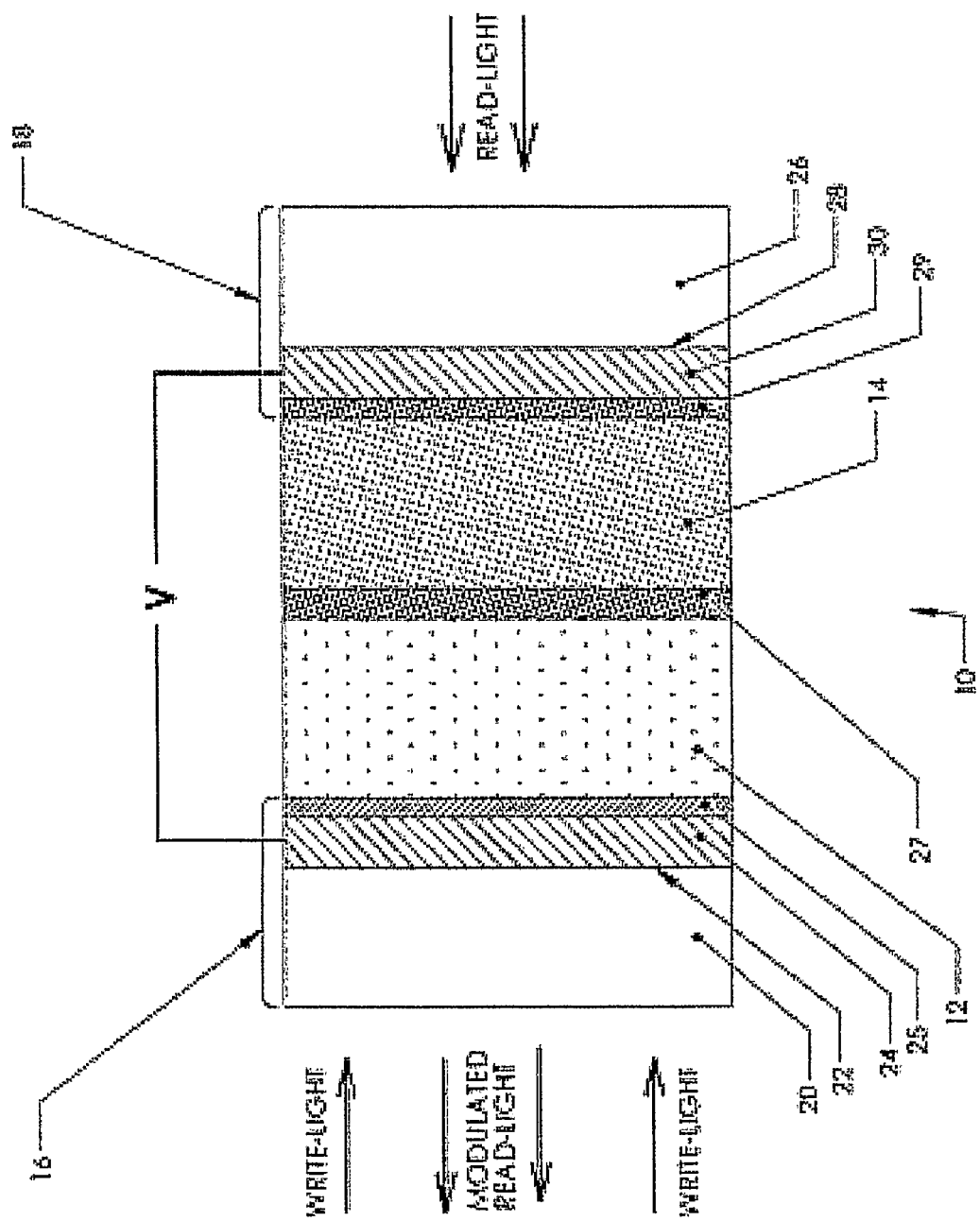

FIG. 1A depicts the case in which both read light and write light enter the OASLM structure at the photoconductor side. FIG. 1B depicts the case in which both the read light and the write light enter the OASLM structure at the liquid crystal side. FIG. 1C depicts the case in which read light enters at the photoconductive side and the write light enters at the liquid crystal side. FIG. 1D depicts the case in which the read light enters at the liquid crystal side and the write light enters at the photoconductor side.

Figure 1E:
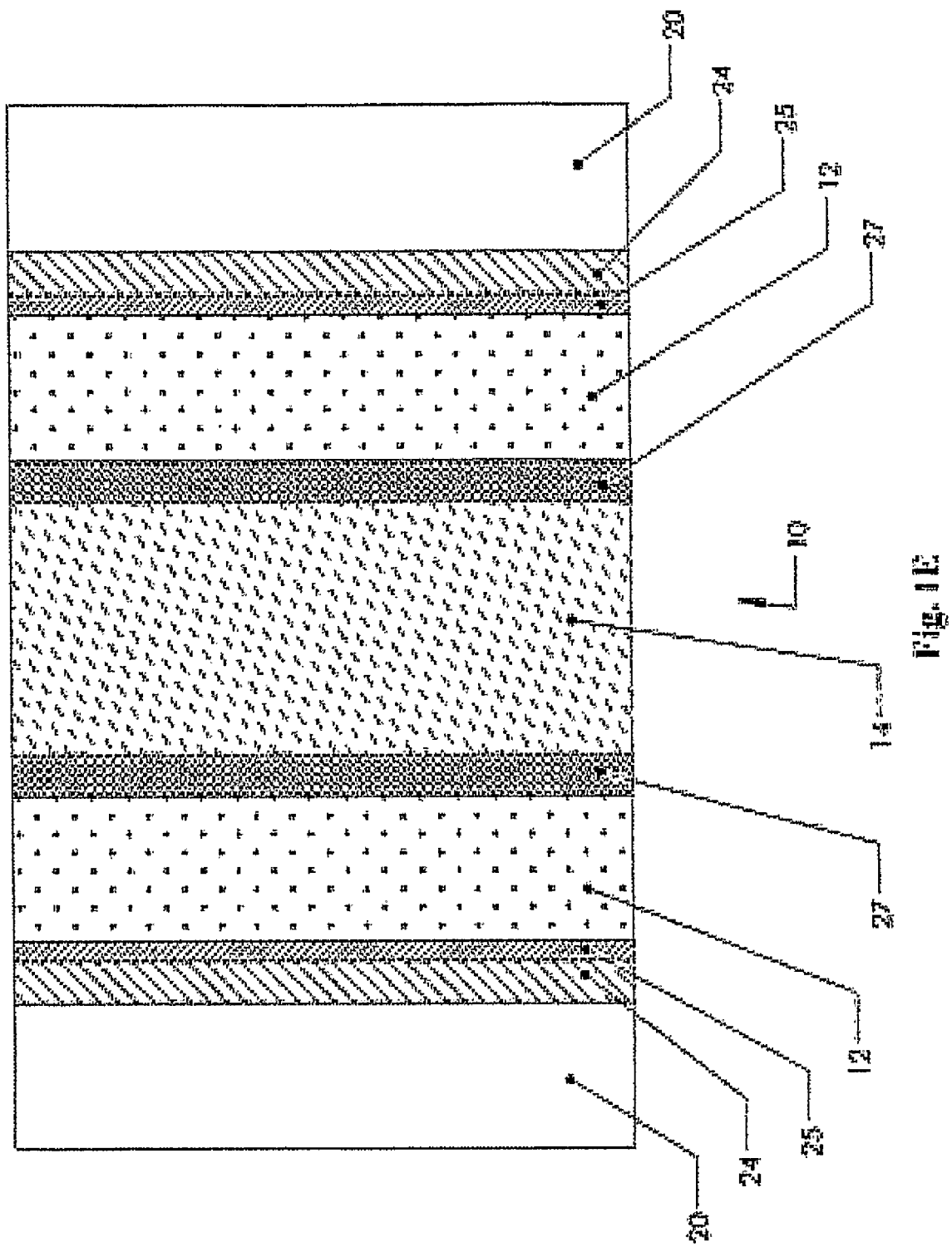
FIG. 1E depicts an alternative general transmissive, photoconductive OASLM structure in which the liquid crystal structure is sandwiched between two photoconductive structures that may be tuned to absorb substantially equal amounts of the write light.

FIG. 1E shows a preferred embodiment in which liquid crystal structure 14 is sandwiched between two photoconductive structures, which preferably are tuned to absorb substantially the same amount of write light. Such tuning can be accomplished by a small adjustment of the alloy composition of the two bulk photoconductive layers or by adjustment of their temperature. This is so because optical absorption is a very rapid function of composition and temperature when the photon energy is near the bandgap energy of the material, which is the case for many of the embodiments of the present invention. This last structure offers the advantage of allowing trapping of photoexcited carriers at unintended defect sites within the photoconductor layers, which defect sites are difficult to prevent, in a manner that will not degrade the performance of the display because, being symmetrically arrayed with respect to the liquid crystal, they do not affect the local voltage appearing across the liquid crystal and thus do not affect the local optical state of the liquid crystal light modulating layer. Tuning might also be accomplished by adjusting the thicknesses of the two layers, but the benefit would be of lesser significance because the charge trapping would be less symmetric. Although it is difficult to polish single crystal photoconductor materials sufficiently flat to realize this sandwich structure, it is relatively easy to form it with amorphous or fine-grained (microcrystalline) polycrystalline materials.

As for the more asymmetric structures, the read light and the write light may be directed into this sandwich structure from either side. There is a structure 25 between the photoconductor side electrode and the bulk of the photoconductive material that serves to suppress the transfer of charged carriers, mobile electrons or holes, between these two materials. In certain embodiments, structure 25 is the space charge depleted region of a p-n junction. In other embodiments, structure 25 is a dielectric layer with conduction band and valence band discontinuities that contribute to this function.

With reference again to FIG. 1, photoconductor 12 absorbs UV light and generates electron-hole pairs that are separated by an electric field produced by an AC supply signal, V, externally applied to electrode structures 16 and 18. The AC supply signal, V, establishes a bias voltage across electro-optic material layer 14. The intensity of incident UV light determines the amount of electrical charge accumulation and the corresponding amount of electrical potential appearing across electro-optic material layer 14. A greater UV light intensity results in a corresponding greater voltage across electro-optical material layer 14. The electrical potential across the electro-optic material causes it to undergo a corresponding change in value of an optical property. A preferred liquid crystal material layer 14 is nematic liquid crystal captured between opposed surface alignment layers that are conditioned to produce perpendicularly aligned or nearly perpendicular directors in the absence of an electric field. The directors of liquid crystal layer 14 reorient in response to a torque imparted by the electrical potential. The reorientation of the liquid crystal directors modulates an optical property of incident visible light propagating through light modulator 10. The concentration of free carriers, n, in photoconductor 12 is selected in accordance with the expression $$n < V(C_{PR} + C_{LC})/eL_{PR},$$

where V is the applied supply voltage, $C_{PR}$ and $C_{LC}$ are the respective capacitances of photoconductor 12 and liquid crystal layer 14, e is the electron charge, and $L_{PR}$ is the thickness of photoconductor 12. The number of carriers present in photoconductor 12 in the absence of incident UV light and in the presence of read (intense visible) light is that which produces across liquid crystal layer 14 an electrical potential or voltage difference that is lower than that which causes a noticeable electro-optic effect in liquid crystal layer 14.

The thickness of photoconductor 12 is set to provide a required modulation of the voltage across liquid crystal layer 14 in accordance with the expression $$L_{PR}/\epsilon_{PR} > (L_{LC}/\epsilon_{LC})[(V_{max}/V_{min}) - 1],$$

where $L_{LC}$ is the thickness of liquid crystal layer 14, $\epsilon_{PR}$ and $\epsilon_{LC}$ are the respective dielectric constants of photoconductor 12 and liquid crystal layer 14, and $V_{max}/V_{min}$ is the modulation ratio of the voltage across liquid crystal layer 14 required to provide sufficient response time and contrast ratio in transmission. $V_{max}$ is the lowest voltage that will cause liquid crystal layer 14 to assume a field aligned (ON) state that provides sufficient contrast ratio and light transmission. $V_{min}$ is the highest voltage that will cause liquid crystal layer 14 to assume a partly relaxed (OFF) state that provides sufficient contrast ratio.

The expression above indicates that liquid crystal mixtures with higher $\epsilon_{LC}$ and larger $V_{min}$ would advantageously enable a reduction in the thickness of the photoconductor 12 ($L_{PR}$). This is an advantage because thinner structures cost less. Moreover, because smaller total numbers of unavoidable free carriers are desirable and because the total number of unavoidable free carriers in the practical semiconductor materials in the photoconductor is a function of thickness, thinner photoconductor regions are better. This thinner photoconductor region may also enable better resolution in the device. The expression above also indicates that the liquid crystal thickness should be as small as possible not only to have a larger capacitance but also to have a faster response time. For this reason, liquid crystal mixtures with a Δn as large as possible are desirable.

One preferred group of liquid crystal materials includes mixtures with negative dielectric anisotropy ($\epsilon\perp > \epsilon_\parallel$) for the vertically aligned nematic (VAN) liquid crystal mode. Typically, vertically aligned nematic liquid crystals have a $\epsilon_{LC}$ in OFF state ($\epsilon_\parallel$) in the range of 3.0 to 4.4 and $V_{min}$ in the range of 2.0 to 2.5 volts. Special VAN liquid crystal mixtures with $\epsilon_\parallel$ in the range of 6.0 to 8.1 and $V_{min}$ in the range of 5.0V to 8.0V have been developed for this purpose. For maximum efficiency, Δnd (cell gap) should be equal to or larger than 0.5 times the wavelength of the incident light.

Another preferred group of liquid crystal materials includes mixtures that have positive dielectric anisotropy ($\epsilon_\parallel > E\perp$). Typically, nematic liquid crystals for the twisted nematic (TN) mode have a $\epsilon_{LC}$ in the OFF state ($\epsilon\perp$) in the range of 3.0 to 5.0 and $V_{min}$ in the range of 0.9 volt to 2.5 volts. Special TN liquid crystal mixtures with $\epsilon\perp$ in the range of 6.0 to 8.1 and $V_{min}$ in the range of 5.0V to 8.0V could be developed for this purpose. To have maximum efficiency for the TN mode, Δnd (cell gap) should be around 0.87 times the wavelength of the incident light.

The relationship above determines the optimal ratio of $(L_{PR}/\epsilon_{PR})/(L_{LC}/\epsilon_{LC})$ for a given set of material and thickness choices. For example, in the case of a negative anisotropy liquid crystal material with a $V_{min}$ of 6.0 volts and requiring a $V_{max}$ of 9.0 volts, a $(L_{PR}/\epsilon_{PR})/(L_{LC}/\epsilon_{LC})$ ratio of 0.5 or greater is required. This implies, for this example, that the capacitance of the liquid crystal portion of the light valve be one-half or greater than the capacitance of the photoconductor portion of light valve.

FIG. 2 depicts a preferred embodiment for a non-sandwiched structure transmissive, photoconductive SLM 31 that uses GaN alloys. For this choice of materials, a window that also serves as a single crystal growth substrate 32 is preferably formed of single crystal sapphire with the c-axis normal. The liquid crystal side window layer material is chosen for its optical transparency for wavelengths of light that are intended to pass through it and for compatibility with a liquid crystal side electrode layer 30, which preferably is formed of indium tin oxide (ITO) or of fine-grained polycrystalline n+ZnO:Al. A nucleation layer 33 that begins the growth, preferably by MOCVD, of AlGaN alloys upon sapphire substrate 32 is preferably substantially pure AlN and not-intentionally doped. A buffer layer 34 that precedes the growth of high electrical quality AlGaN alloys is not intentionally doped and has a small concentration of Al, just enough to suppress absorption of the light that is intended to pass through it and about the same as that in a photoconductor side electrode layer 35. Photoconductor side electrode layer 35 is preferably about 0.5 µm thick and formed of heavily silicon-donor-doped gallium nitride (n+GaN:Si) or with n+$Al_yGa_{1-y}N$ alloy with $y \leq 0.2$ to suppress the absorption of write light therein. The choice of materials for liquid crystal side electrode layer 30 is in this configuration insensitive to the composition of the photoconductor structure because the liquid crystal structure intervenes. The liquid crystal material is provided with an alignment layer 38a on the photoconductor side and an alignment layer 38b on the side away from the photoconductor that are preferably formed of rubbed polyimide or, especially if the UV write light is to pass through them, of an inorganic insulating alignment layer, e.g., $SiO_x$, as is known in the art. There is between photoconductor side electrode 35 and the bulk of a photoconductive layer 37 a structure 36 that serves to suppress the transfer of electrical charge carriers between these two materials. This will in some embodiments be the space charge depleted region between the n+ AlGaN electrode and a p- GaN:Mg bulk photoconductive layer. In other embodiments, particularly those that use not-intentionally doped GaN for the photoconductor, structure 36 will be a layer of not intentionally doped $Al_zGa_{1-z}N$ with alloy parameter z significantly higher than that in the electrode layer and extending to z=1 (also significantly higher than in bulk photoconductive layer).

Figure 3:
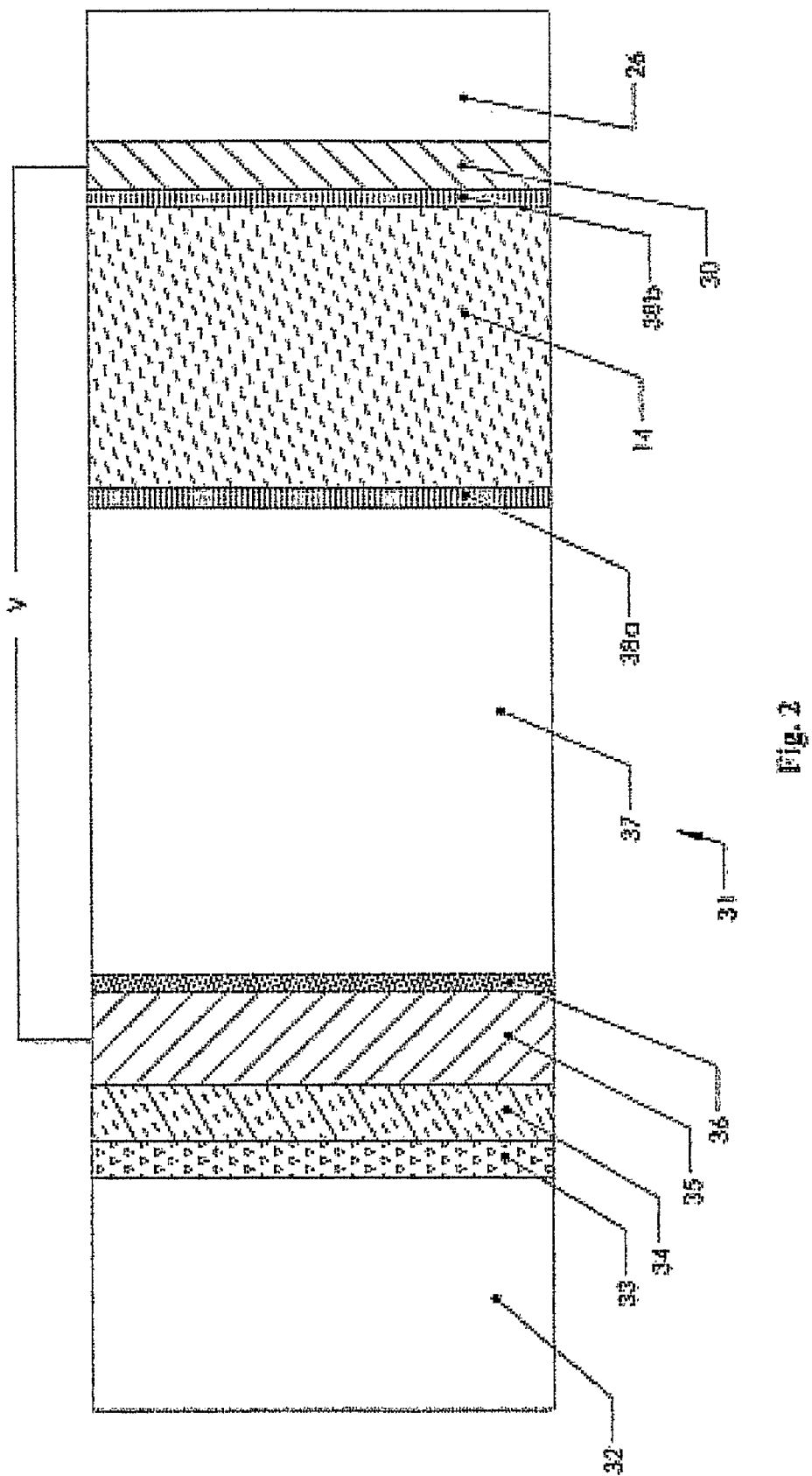
FIG. 3 is a diagram of one embodiment of a photoconductive-side electrode structure for a transmissive, photoconductive OASLM that uses GaN alloys.
Figure 3:
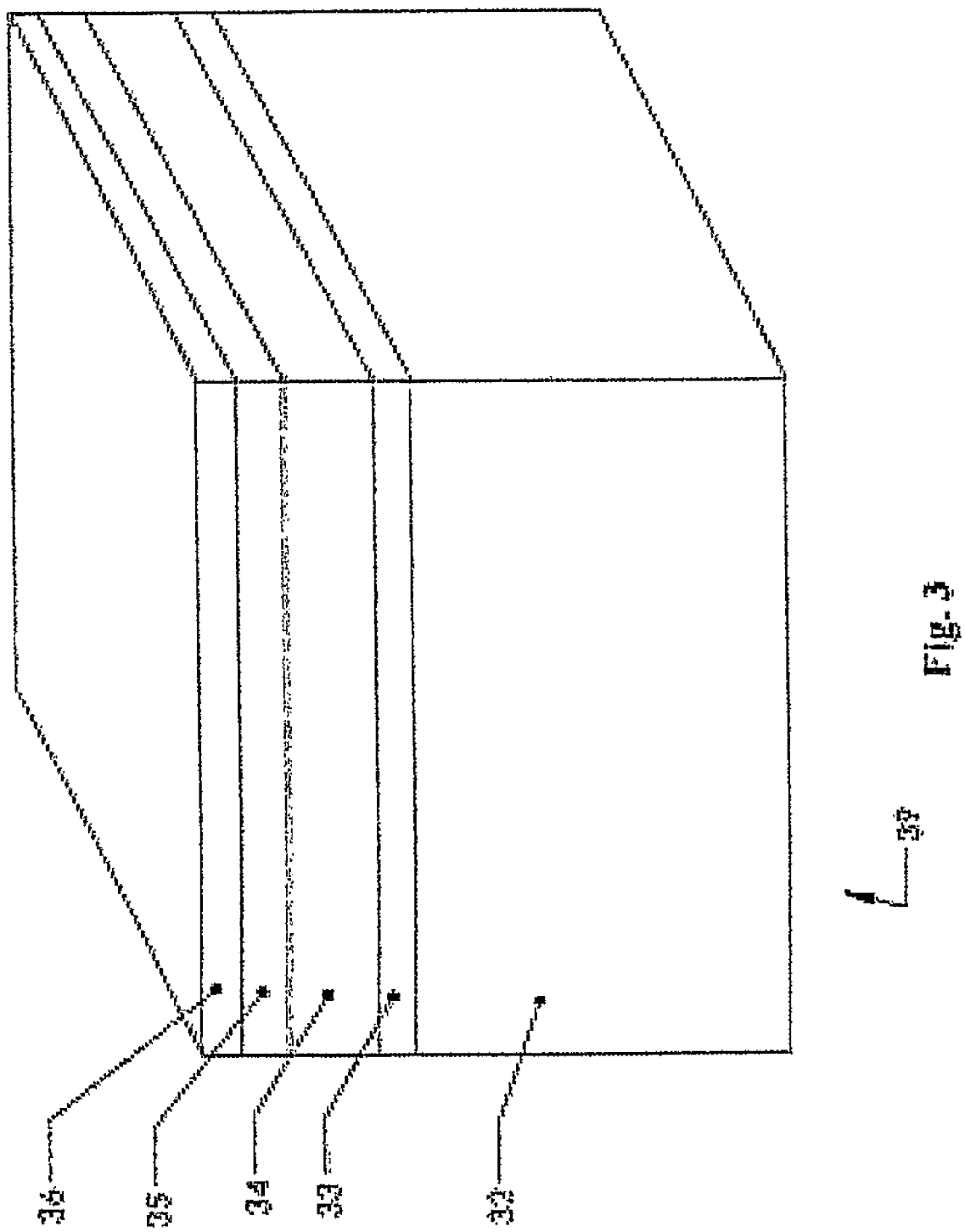

FIG. 3 is a diagram of one embodiment of the a photoconductor-side electrode structure 39 for a transmissive, photoconductive OASLM that uses AlGaN alloys in the photoconductive structure. It shows that the single crystal, c-axis normal, double-sided polished sapphire window-substrate 32 is preferably about 430 µm thick, while an Al rich nucleation layer 33 need only be about 10 nm thick. An Al lean buffer layer 34 is about 0.3 µm thick. Layers 33 and 34 are not intentionally doped and grown by MOCVD. Electrically conducting electrode layer 35 is heavily donor doped n+$Al_yGa_{1-y}N$:Si with alloy parameter y such that $0 \leq y \leq 0.2$. The purpose of adding Al is to suppress the absorption of UV write light at the operating temperature of the projection display, which is about 50° C. for the case in which the write light enters at the photoconductor side. In preferred embodiments for which the write light enters only from the liquid crystal side, there is no need for any part of the photoconductor-side electrode structure to be transparent for the write light because the write light is absorbed within the photoconductive layer. The photoconductive layer need be transparent only for the read light. The thickness of the electrode is determined in combination with the doping level to provide a sheet resistivity that is less than 2,000 ohms per square and preferably about 100 ohms per square. In addition to the space charge depleted region that forms because of the p-n junction resulting from the n+ doping of the photoconductor-side electrode and the p- doping of the GaN:Mg photoconductor material 37, there is an appropriate 50 µm thick barrier layer structure 36 of not-intentionally doped $Al_zGa_{1-z}N$ alloy that serves to suppress the transfer of charged carrier (mobile electrons and holes) between photoconductor side electrode layer 35 and bulk photoconductive layer 37. To accomplish this suppression of charge carrier transfer, the condition $y+0.05 \leq z \leq 1.0$ should obtain.

Figure 4:
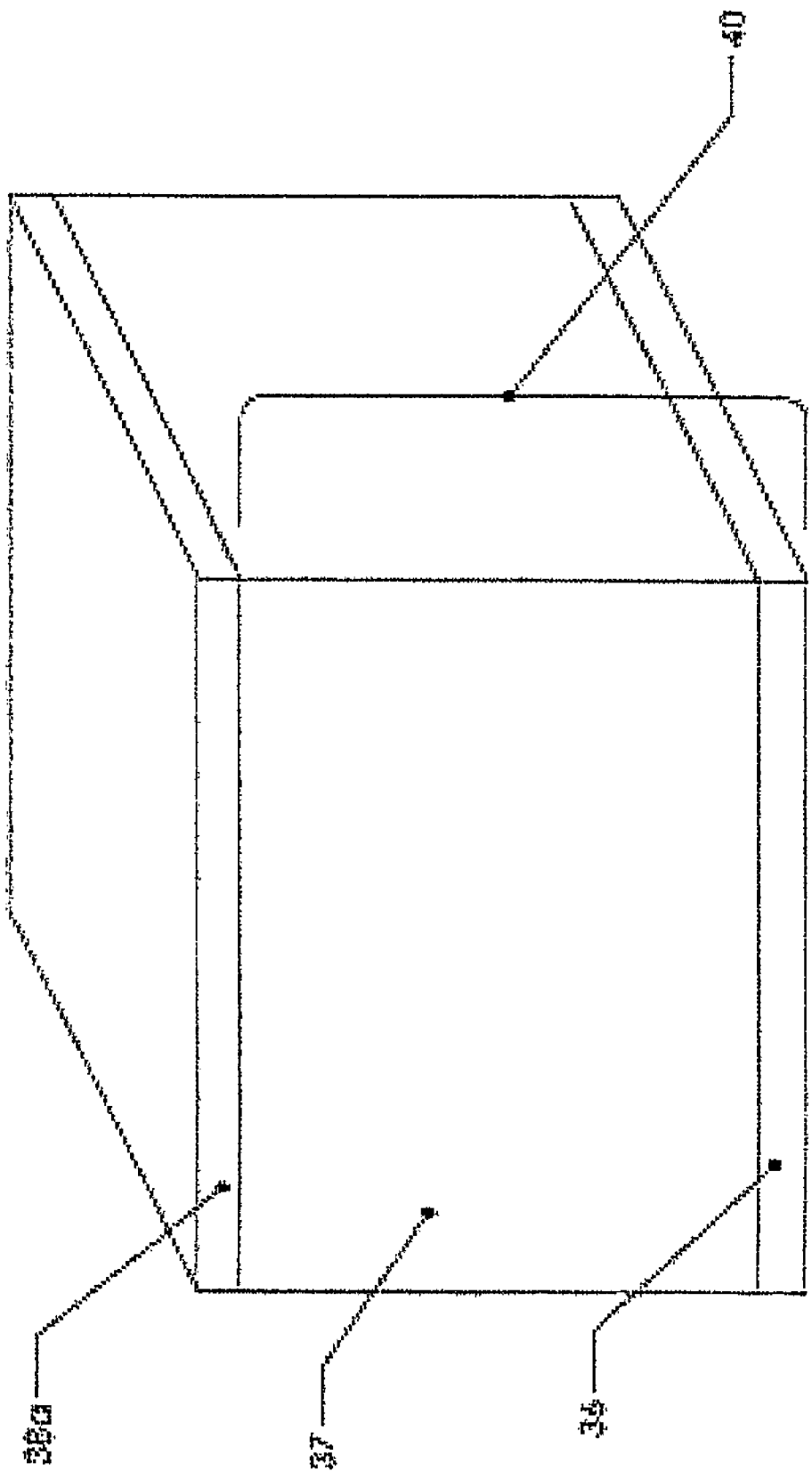
FIG. 4 is a diagram of one embodiment of a photoconductive structure for a transmissive, photoconductive OASLM that uses p-type GaN as a photoconductor.

FIG. 4 is a diagram of one embodiment of a photoconductive structure for a transmissive, photoconductive OASLM that uses p-type GaN as the bulk of the photoconductor material. In addition to the space charge depleted region that forms because of the p-n junction resulting from the n+ doping of the photoconductor-side electrode and the p- doping of the GaN:Mg photoconductor material 37, there is a barrier layer structure 36 of not-intentionally doped $Al_zGa_{1-z}N$ alloy that serves to suppress the transfer of charged carrier (mobile electrons and holes) between photoconductor side electrode layer 35 and bulk photoconductive layer 37. To accomplish this suppression of charge carrier transfer, the condition $y+0.05 \leq z \leq 1.0$ should obtain.

FIG. 5A is a diagram of one embodiment of a photoconductive structure for a transmissive, photoconductive OASLM that uses not-intentionally doped GaN as the bulk photoconductor material. Because the space charge depleted region in this case is much less effective in preventing the structure from acting as a photodiode, i.e., transferring between the electrode and the photoconductor, the use of barrier layer structure 36 is very important to the performance of the projection display device and to the service life of the liquid crystal cell.

An example of a transmissive, photoconductive OASLM constructed with a not-intentionally doped GaN photoconductor is a combination of the electrode structure of FIG. 3 and the photoconductive structure of FIG. 5A. Structure 42 includes a 4 µm thick gallium nitride (GaN) photoconductive film layer 41 with a free carrier concentration, n, equal to about $10^{12}$ $cm^{-3}$ and having a dielectric constant, $\epsilon_{PR}=9.0$. The GaN photoconductor layer 41 covers an about 0.5 µm thick GaN:Si electrode layer 24, n-doped with silicon (Si) for a carrier concentration, n=$10^{18}$ $cm^{-3}$. Substrate 32 is a 430 µm thick aluminum oxide ($Al_2O_3$) sapphire wafer. In this example, liquid crystal layer 38a is aligned homeotropically in the initial state, realizing the vertically aligned nematic effect. In this case, the dielectric constant component parallel ($\epsilon_\parallel$) to the directors of the liquid crystal material is the smaller of the two components of the dielectric tensor. Increasing the voltage across liquid crystal layer 14 causes reorientation of the directors and therefore changes its optical properties, as well as the effective dielectric constant. Liquid crystal layer 14 is about 4.5 µm thick and has a dielectric constant, $\epsilon_{LC}=\epsilon_\parallel \approx 8.0$. This example of a transmissive photoconductive OASLM 10 is sensitive to UV light of 365 nm and shorter wavelengths and is negligibly sensitive to visible light.

FIG. 5B depicts a photoconductive structure 46 that differs from that of FIG. 5A only by the addition of a write light extra absorption layer 44 that is epitaxial and formed by alloying 2% of InN into the GaN and located on the photoconductive side of liquid crystal alignment layer 38a and by alloying 5% AlN with the GaN in the broad region between this absorption layer and electrical isolation layer 36. The effect of the alloying described above is to decrease the semiconductor bandgap in the former and to increase it in the latter. For wavelengths of write light in several preferred embodiments, this causes much less of the write light to be absorbed in this broad layer with the wider bandgap and to cause most of the write light to be absorbed in added layer 44 with the smaller bandgap. Therefore, the broad layer with the increased bandgap is relabeled from 41 in FIG. 5A to 45 in FIG. 5B and is now denoted as a "carrier transport layer" 45 rather than as a photoconductive layer 41. Absorption layer 44 is relatively thin to provide a short carrier travel path to liquid crystal layer 14 and reduce carrier spreading at the interface to liquid crystal layer 14. A reduction in carrier spreading contributes to increased image resolution.

FIG. 5B depicts a particular case for the practice of the present invention. In general, a carrier transport layer 45 that is a wide bandgap semiconductor material and an absorption layer 44 that is a semiconductor material with a slightly narrower bandgap can be configured as shown in FIG. 5B such that the combination of the bandgaps provides, for an appropriate choice of write light wavelength and operating temperature, substantial optical transparency through carrier transport layer 45 for the write light that is then absorbed in absorption layer 44. When the write light is absorbed in absorption layer 44, the photo-excited carriers generated thereby drift in the electric field through both carrier transport layer 45 and absorption layer 44 until stopped by electrical isolation layers 36 and 38a. This is so because the steps in the conduction band in the valence band at the interface between layers 44 and 45 is insufficient to prevent the large majority of free electrons and free holes from drifting across. This long drift path provides high modulation of the voltage across liquid crystal layer 14. Absorbing UV radiation in an absorbing layer 44 in proximity to liquid crystal layer 14 provides, therefore, superior resolution and sensitivity to absorption of UV light in carrier transport layer 41 of FIG. 5A for write light wavelengths and operating temperatures that may sometimes be practical for the practice of the present invention, given the availability of economical UV and very bright visible light sources that are required to manufacture marketable projection displays according to the invention.

Figure 5C:
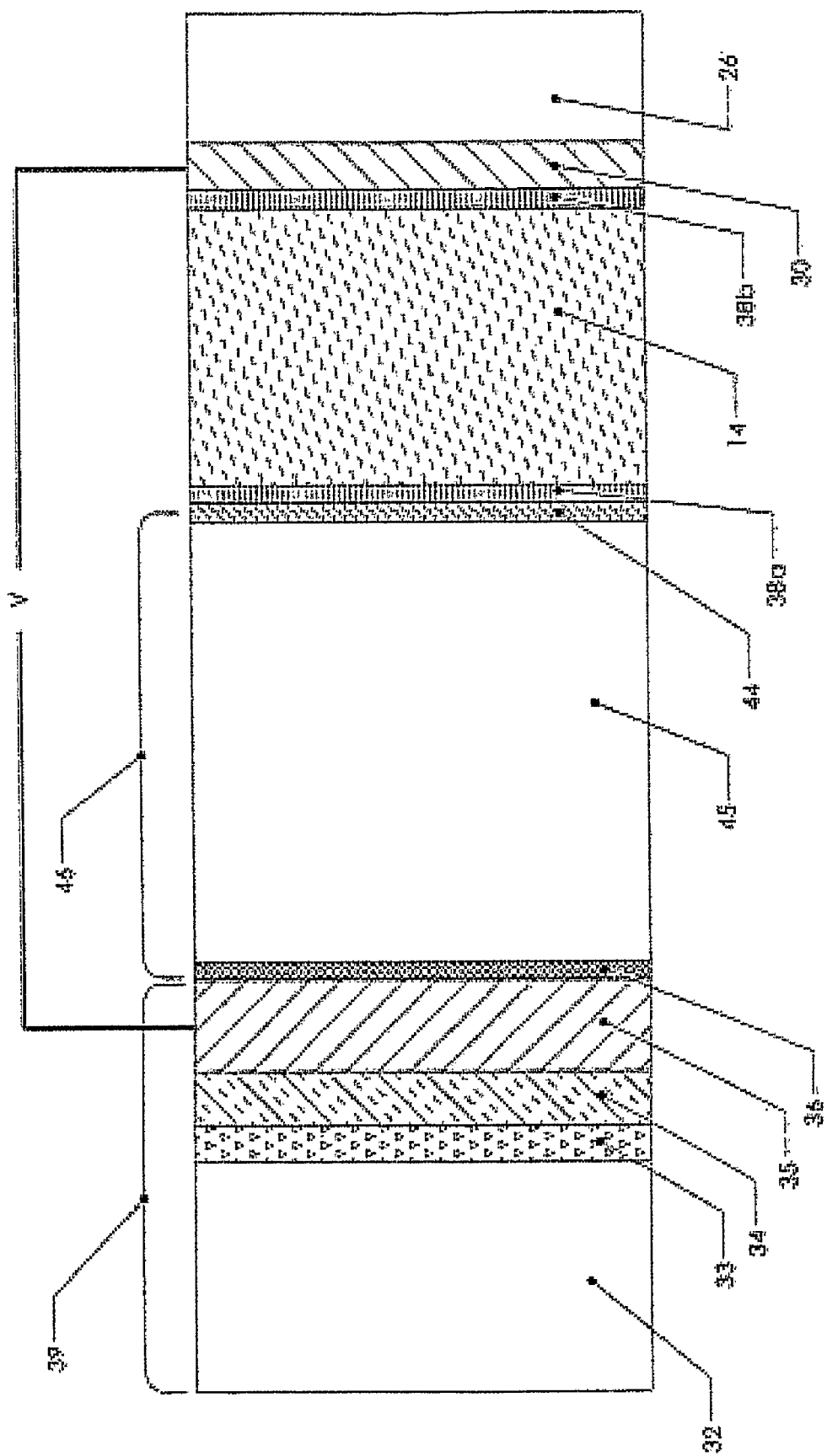
FIG. 5C differs from FIG. 2 by the addition of a thin write light absorption layer by alloying InN into the GaN photoconductor.

FIG. 5C shows an example of a photoconductive structure 46 for a transmissive, photoconductive OASLM 10 includes a 0.5 μm indium gallium nitride (InGaN) (In=2%) absorption layer 44 and a 5.0 μm thick GaN transport layer 45, with a free carrier concentration, n, equal to about $10^{12}$ cm$^{-3}$. Electrode structure 39, substrate 32, and liquid crystal structure 38a, 14, and 38b are the same as those described in the example for transmissive, photoconductive OASLM 31. This example of a transmissive, photoconductive OASLM 10 is sensitive at 30° C. to UV light of 375 nm and shorter wavelengths. The wavelength to which such an example of OASLM 10 is sensitive depends in part on the concentration of indium (In). An indium concentration of 2%-10% in InGaN absorption layer 44 provides at 30° C. an absorption wavelength band range of between about 375 nm and about 390 nm, respectively.

The use of an added absorption layer and a carrier transport layer, rather than simply one photoconductive layer, in the photoconductive structure is particularly effective for providing high resolution if used in the sandwich configuration of FIG. 1E. Preferred embodiments that employ this option focus the write light on a plane located at the center of liquid crystal layer 14. Electron mobility is much greater than hole mobility in almost all wide bandgap semiconductors that one could employ to practice the present invention. As stated above, the bias voltage applied across electrode structures 16 and 18 is (for the sake of the service life of the liquid crystal cell) AC with no DC offset. For one polarity, photogenerated free electrons created in the absorption layer located adjacent the liquid crystal on one side of the sandwich will drift a large fraction of the distance to the photoconductor side electrode structure 16, while the free electrons created in the absorption layer located on the other side of the sandwich will accumulate against alignment layer 38a located adjacent that side. At the same time, photogenerated free holes created in the absorption layer located adjacent the first side will accumulate against its alignment layer, very near where they were created, while on the second side the free holes created in that absorption layer may drift a much smaller fraction of the distance to photoconductor side electrode structure 16 of that side. Because the low mobility of the holes is a direct consequence of scattering events that, on average, impart lateral momentum to these holes, the amount of lateral spreading is much greater for the holes than for the electrons. Of course, for the opposite polarity, the various effects just noted will occur on the opposite sides. As stated above, the total thickness of the photoconductive material layer is bounded from below by the necessity that the total capacitance of this layer be bounded from above for sufficient modulation of the voltage developed across the liquid crystal. Use of the sandwich structure means that the thickness of the photoconductive layer on each side is one-half of what it would be for the non-sandwich structure with the same material and capacitance. Of course, as indicated above, the difficulty of polishing sapphire sufficiently flat to manufacture AlGaN photoconductor structures on sapphire substrates in the sandwich configuration may be so great as to make such an embodiment impractical. It is much more practical, however, to manufacture this embodiment with the microcrystal and amorphous photoconductor materials, which are further described below, that can be grown on much less rigid substrates.

FIG. 6 depicts the addition of an amorphous, electrically insulating layer 43 atop the photoconductor layer for the particular case in which the photoconductor is GaN. This amorphous layer may be $SiO_2$, silicon-oxi-nitride, or $Al_2O_3$ or other materials known in the art and may be produced by electron beam deposition or by other methods known in the art. Its purpose is to protect and passivate the material below as it passes through the manufacturing process.

Figure 7A:
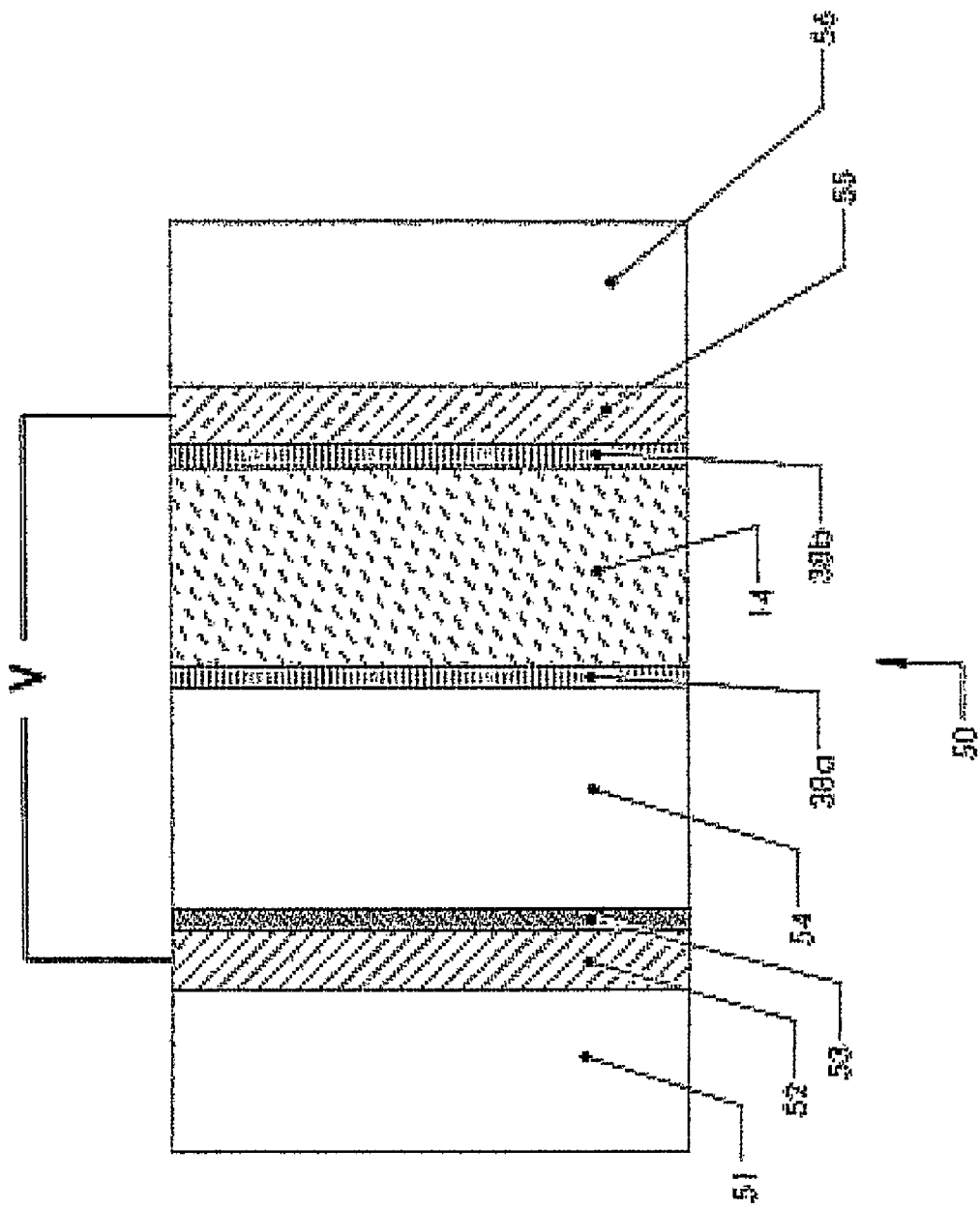
FIGS. 7A and 7B are transmissive, photoconductive OASLMs using microcrystalline alloys of ZnO grown by PECVD. The OASLM of FIG. 7B has an amorphous insulating layer between the photoconductor and the alignment layer for the liquid crystal. The OASLM of FIG. 7A does not have such a layer.
Figure 7B:
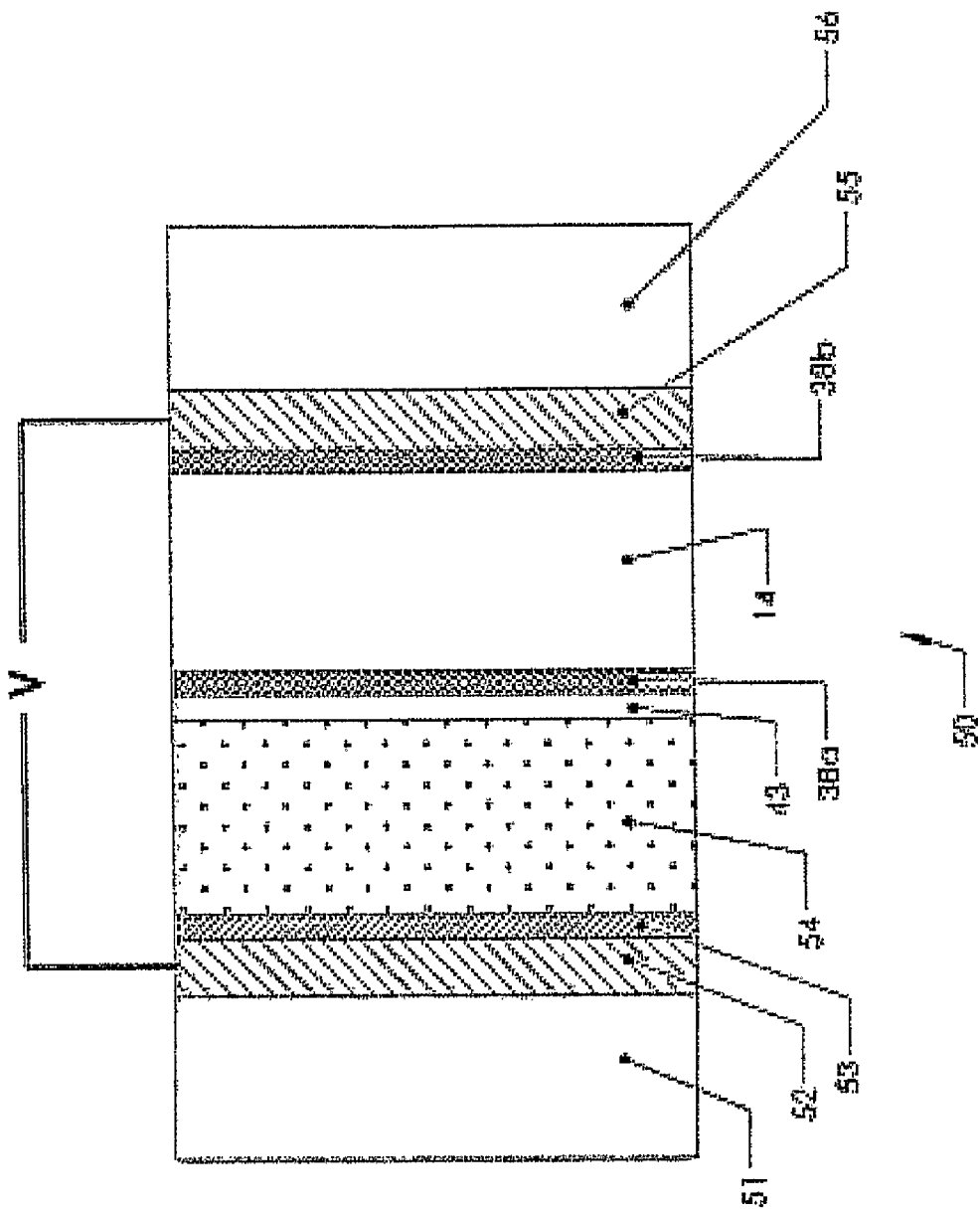

FIGS. 7A and 7B depict transmissive, photoconductive OASLMs 50 constructed using microcrystalline alloys of ZnO as a photoconductor. They differ only in that the OASLM of FIG. 7B has an amorphous, electrically insulating layer 43 between the last layer of the photoconductive structure 54 and alignment layer 38a of the liquid crystal light modulating structure, while the OASLM of FIG. 7A does not have such a layer 43. A window 51, which also serves as the substrate for the growth by plasma enhanced chemical vapor deposition (PECVD) of the ZnO alloys, is glass in this embodiment. The photoconductor side electrode 52 material is selected from a group known in the art that includes indium tin oxide, microcrystalline n+ZnO:Al, and the alloy of ZnO and $Ga_2O_3$ grown by PECVD with the ratio of TMG set at 0.2, as described by J. J. Robbins, C. Fry, and C. A. Wolden, "An interrogation of the zinc oxide-gallium oxide phase space by plasma enhanced chemical vapor deposition," *Journal of Crystal Growth*, Vol. 263, pp. 283-90 (2004) (hereafter, RFW). Although there are several practical ways to provide the electrically isolating layer 53, the method depicted in FIG. 7A is PECVD growth of the ZnO—$Ga_2O_3$ alloy the ratio of TMG set at 0.7, as described by RFW. For this embodiment, a photoconductive layer 54 is ZnO—$Ga_2O_3$ alloy grown by PECVD with the ratio of TMG set at 0.4, as described by RFW. One should note that this succession of ZnO alloy layers can be grown with one run in a reaction chamber simply by adjusting the flow rates of the various precursor gasses. $In_2O_3$, for example, can be added to the alloy mix, for the purpose of adjusting optical properties such as the bandgap of the alloy, simply by adding an appropriate In bearing precursor gas to the reaction system. Finally, these ZnO alloys grown in this way have remarkably low dielectric constants (see FIG. 1 of RFW), about 3.7 for the photoconductive material used in this embodiment (TMG ratio=0.4) as compared to the 9.0 dielectric constant of GaN and that this means that the photoconductor can be correspondingly thinner for the same capacitance. This is a major advantage with respect to the optical resolution that can be obtained.

FIG. 8 depicts a photoconductor side electrode structure 57 for a transmissive, photoconductive OASLM 50 that uses microcrystalline ZnO alloys grown by PECVD.

FIG. 9 depicts a photoconductive structure 58 for a transmissive, photoconductive OASLM 50 that uses ZnO alloys grown by PECVD.

FIG. 10 depicts a transmissive, photoconductive OASLM 60 that uses hydrogenated amorphous alloys of silicon and carbon, a-$SiC_x$:H as a photoconductor. In this embodiment, a photoconductor side window 61 also serving as a substrate for the growth of the amorphous alloy is glass. In this embodiment, the photoconductor side electrode material is ITO, although n+ZnO:Al could also be used. In this embodiment, the amorphous electrically isolating layer 43 is $SiO_2$. In this embodiment the a-$SiC_x$:H photoconductive layer 62 is grown by high frequency (100 MHz) radio frequency plasma enhanced chemical vapor deposition (HF RF PECVD).

Figure 11A:
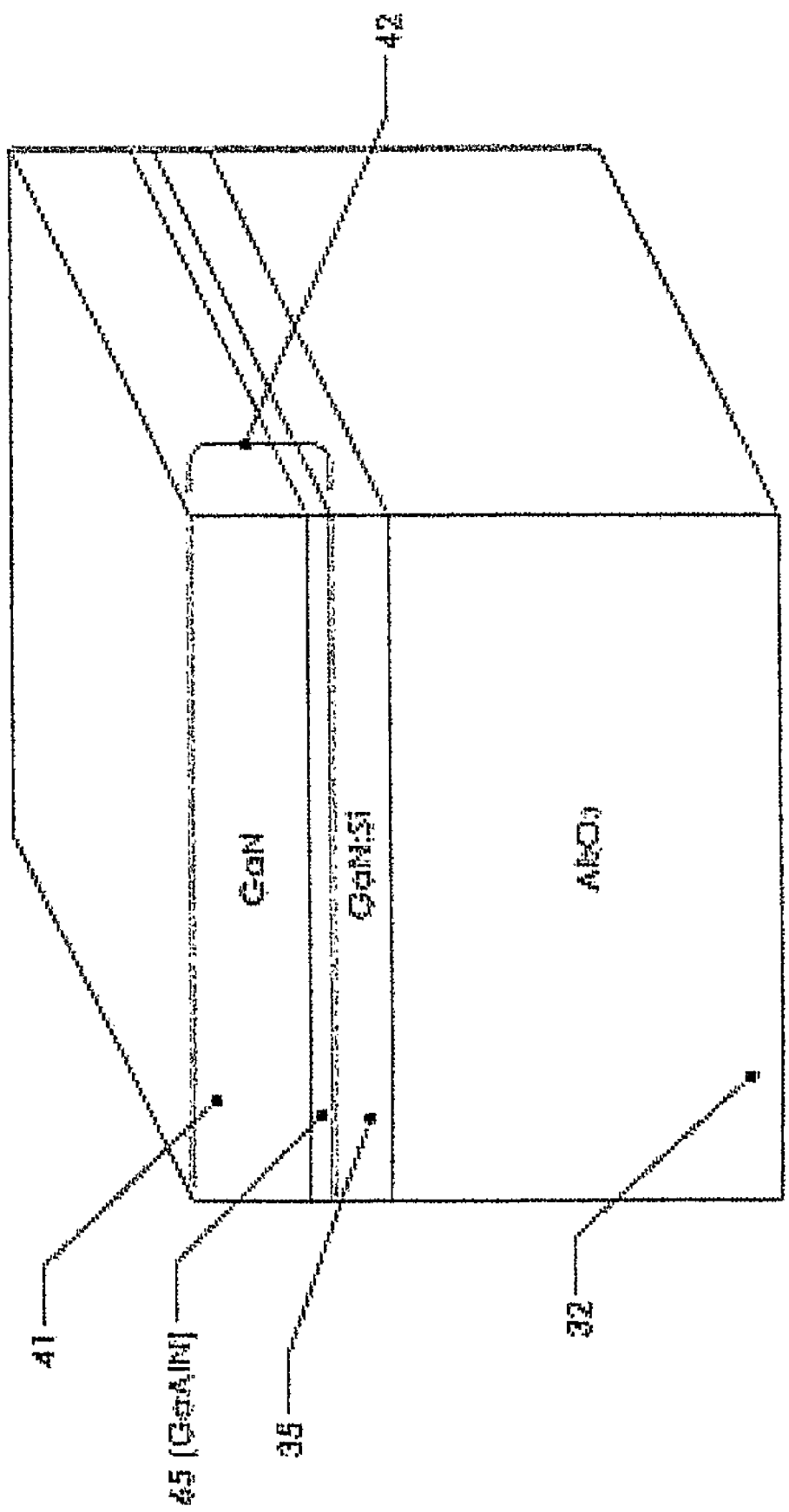
FIG. 11A depicts a dielectric barrier to provide electrical isolation between the photoconductor-side electrode and the photoconductive material for the particular case that the barrier material is high Al content AlGaN alloy, that the photoconductive material is GaN, and that the option of including a carrier transport layer and a write light absorption layer within the photoconductive structure is not employed.
Figure 11B:
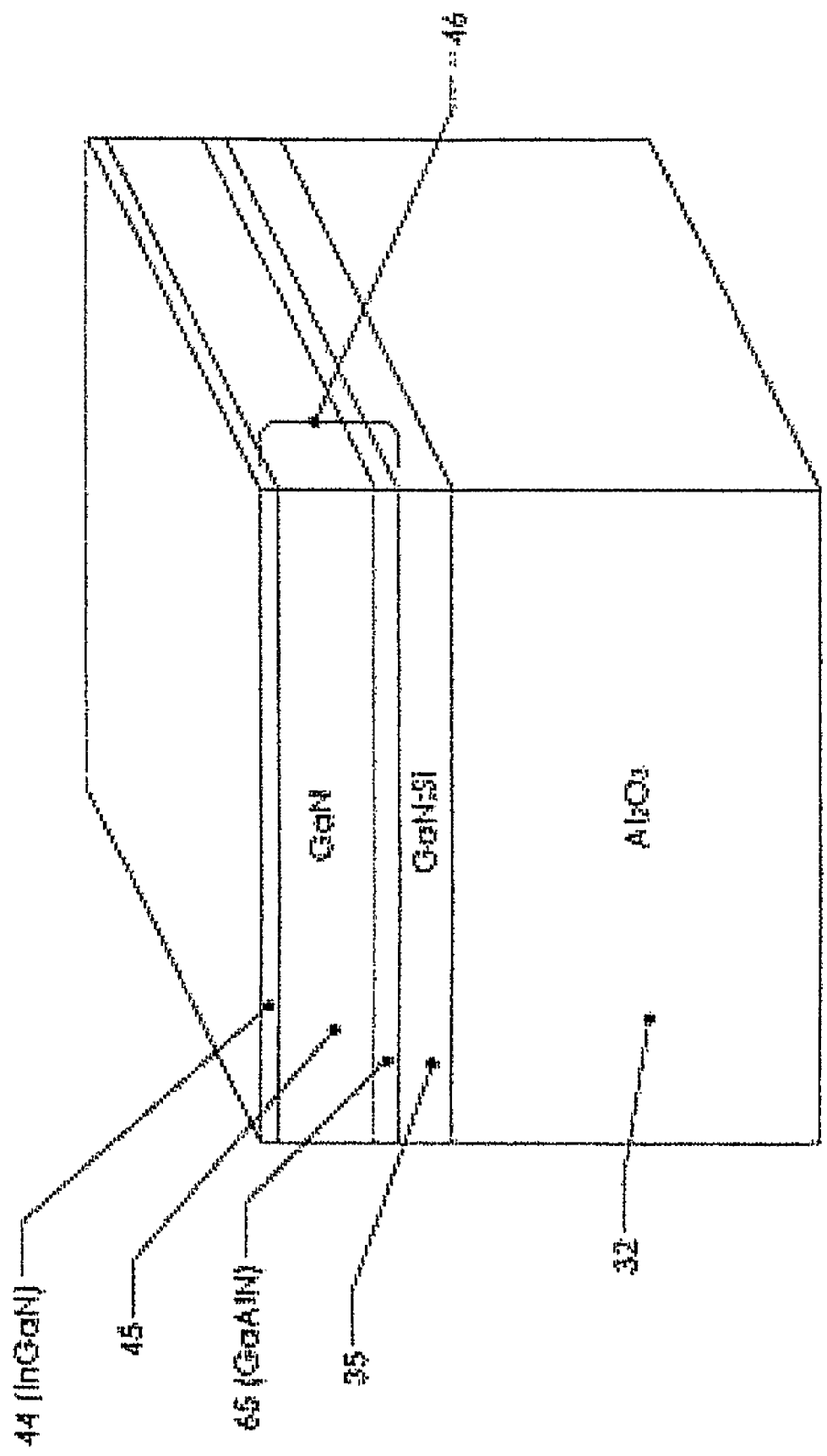
FIG. 11B depicts a dielectric barrier that provides electrical isolation between the photoconductor-side electrode and the carrier transport layer material for the particular case in which the barrier material is high Al content AlGaN alloy and the carrier transport material is 5% AlN AlGaN alloy.

FIGS. 11A and 11B show the inclusion of a dielectric barrier layer 65 in each of photoconductive structures 42 and 46, respectively. FIG. 11A shows a photoconductive structure 42 in which barrier layer 65 is positioned between photoconductive layer 41 and electrode layer 35; and FIG. 11B shows a photoconductive structure 46 in which barrier layer 65 is positioned between carrier transport layer 45 and electrode layer 35. Barrier layer 65 is formed of wide bandgap, low carrier concentration semiconductor material, with the potential barriers at the valence band and the conduction band (i.e., the band discontinuities between the barrier material and the GaN on both sides) exceeding 0.5 eV. Barrier layer 65 forms an interface between the electrode and photoconductive material layers to prevent electrical current injection across the interface. Such current injection is prevented by discontinuities in the bands that create potential barriers impenetrable by the carriers on either side of the interface at the operating temperature. FIGS. 11A and 11B show no nucleation layer and no buffer layer between the sapphire substrate and the electrode layer. This is so because they were grown by hydride vapor phase epitaxy (HVPE), which does not require such nucleation and buffer layers. Use of nucleation and buffer layers is the standard practice for MOCVD grown AlGaN single crystalline alloy. Single crystal AlGaN alloys can also be grown upon sapphire substrates without nucleation and buffer layers by high pressure, high temperature sublimation methods.

A structure grown on a sapphire substrate is an example of photoconductive structure 42 constructed with barrier layer 65 and of photoconductive structure 46 constructed with barrier layer 65. Electrode layer 35 is formed by epitaxial growth of about 1.0 µm thick, highly n-doped GaN. Each barrier layer 65 is formed by epitaxial growth of about 10 nm thick aluminum nitride (AlN) or about 30 nm thick gallium aluminum nitride (GaAlN) (Al=25%) on conductive layer 35.

FIG. 12 depicts a graded alloy dielectric structure 70 to provide electrical isolation between the photoconductor-side electrode structure and the photoconductive structure of a transmissive, photoconductive OASLM for the particular case in which AlGaN alloys are used for the photoconductive materials. The particular advantage of this embodiment is that it suppresses photoemission of carriers across the dielectric barrier, which can occur if the potential barriers provided by the valence and conduction band discontinuities are essentially vertical as a consequence of the material variations being abrupt.

With reference to FIG. 12, a first barrier layer 71 of $Al_zGa_{1-z}N$ alloy with alloy parameter z varying monotonically upward is grown, preferably by MOCVD and by varying the flow rate of the Al-bearing precursor gas, is grown upon the n+AlGaN electrically conducting electrode material 35, then a second barrier layer 72 of high and substantially constant Al content, i.e., constant z, AlGaN is grown in the same reactor by the same process, then a third barrier layer 73 with alloy parameter z varying monotonically downward to finally match the Al content of the bulk photoconductive material 37 (or, if the carrier transport layer plus write light absorption layer option be employed, of the carrier transport layer) is grown in the same reactor by the same process. The diagram 75 in FIG. 12 illustrates this variation of the alloy parameter z with depth through the resulting dielectric structure. A preferred alloy parameter z profile 75 is one in which barrier layer 71 increases monotonically over at least four times the electron scattering-length under the operating temperature of the projector device in which the SLM is installed, barrier layer 72 remains approximately constant for at least about eight times the electron scattering length, and barrier layer 73 decreases monotonically over at least about four times the electron scattering length. Although FIG. 12 shows a maximum value z=1, to achieve profile 75, the condition $y+0.05 \leq z \leq 1.0$ should obtain.

The effect of the alloy grade structure 70 in suppressing transfer of charged carriers across the dielectric barrier by internal photoemission can be understood as follows. The reason that photoemission from a solid into vacuum can occur with high probability is that the interface between the solid and the vacuum can be very abrupt. An electron in the thermal distribution around the Fermi Level, $E_F$, can be well within an inelastic scattering length of the surface and not have a significant electric field causing it to drift deeper into the solid when it is photoexcited into a state in the conduction band higher than the state from which it started by an amount equal to the energy of the photon, hv. In this excited state, the electron may have kinetic energy up to hv greater than it had in the initial, thermal state, and its momentum may be directed toward the surface. If its momentum and kinetic energy are sufficient to take it across the potential energy barrier between the solid and the vacuum just outside the solid, and if the electron does not undergo thermal process by scattering before it can exit, then the electron will exit the solid, i.e., it will be photoemitted. Similarly, charged carriers near a dielectric barrier may be photoexcited by absorption of a photon of either the write light or of the read light to an energy greater than can be provided by the band discontinuity afforded with practical materials and processes and, once so excited, the charge carrier may enter the barrier material and, if not forced back by any field, it may continue across the barrier to the other side. Thus, carriers can be photoemitted across dielectric barriers within semiconductors as well as from solids into vacuum.

The structure 70 of FIG. 12 prevents such cross barrier internal photoemission by providing a "separation layer" 70 of material between photoconductive-side electrode 35 and photoconductive layer 37 that stops the photoexcited electrons coming from the electrode and returns these electrons to the electrode. It also stops photoexcited electrons in photoconductive layer 37 from getting into photoconductive-side electrode 35 and returns them to photoconductive layer 37. To do this, separation layer 70 is made to vary in composition such that the conduction band slopes upward going from photoconductive-side electrode 37 into separation layer 70 and downward going from separation layer 70 into photoconductive layer 37. To prevent photogenerated holes in photoconductive layer 37 that may have drifted to the interface with separation layer 70 from being photoexcited through separation layer 70 into electrode 35, the valence band should slope upwards going from separation layer 70 into photoconductive layer 37. Because the bandgap of the material that provides photoconductor-side electrode is sufficiently wider than the energy of all photons passing through it and because photoconductor-side electrode material 35 is heavily doped, there will be an inconsequential density of holes (photogenerated or other) at the interface between photoconductor-side electrode 37 and separation layer 70. Thus, it does not matter that the valence band at the interface between photoconductor-side electrode 37 and separation layer 70 might slope upward. However, these slopes on the two sides of the separation layer is sufficiently gradual to provide a few inelastic scattering lengths on both sides.

The photoconductive structures shown in FIGS. 2, 4, 5A, 5B, 5C, 6, 11A, 11B, and 12 are manufactured by epitaxial growth in a single technological process. These photoreceptor structures provide high sensitivity in the UV region of electromagnetic radiation spectrum and are negligibly sensitive to visible light. These photoconductive structures exhibit high uniformity of structural, operating, and performance parameters.

Preferred embodiments of spatial light modulation systems using projector light engines implemented with the above-described liquid crystal-based spatial light modulators present enlarged, high-resolution color images on a display screen. Each of these embodiments is constructed with two optical paths located within the projector light engine. These paths are referred to as the write (image definition) optical path and the read (illumination and visible image formation) path. The write optical path includes one to three small spatial light modulators that receive image definition light propagating from LCOS (liquid-crystal-on-silicon) microdisplay devices. LCOS devices introduce color image modulation on UV writing beams propagating from one or more UV light sources, which may include an arc lamp. The UV writing beams generate color-relative images on a photoreceptor in each of three transmissive spatial light modulators (SLMs). The read optical path provides visible, i.e., red, green, and blue (RGB) light emitted by an arc lamp or other white light source to each of the SLMs. The photoconductive areas in each of the SLMs are excited by the UV writing beam, creating a voltage that controls the orientations of directors of the liquid crystal material in each location corresponding to an image from an LCOS microdisplay pixel area. Changing the director orientation changes the polarization direction of illumination beams and results in light intensity modulation when the visible light passes through an analyzer optically associated with the SLM. The three color beams are then recombined and directed through a projection lens to form a color image on a display screen.

The following projector light engine embodiments differ in how image definition and illumination optical paths are configured, the UV sources are created, the spatial light modulation is introduced, and a color image is obtained. The UV light source in the image definition light path could be the UV radiance from the arc lamp used in the projector engine, individual UV light emitting diodes (LEDs) with different wavelengths, or a UV LED array formed on a single substrate with cone reflectors and microlenses to control the divergence of output beams. Projector light engine embodiments shown in FIGS. 13 and 14A, respectively, use three discrete UV LEDs as a UV light source to create UV write light beams.

Figure 13:
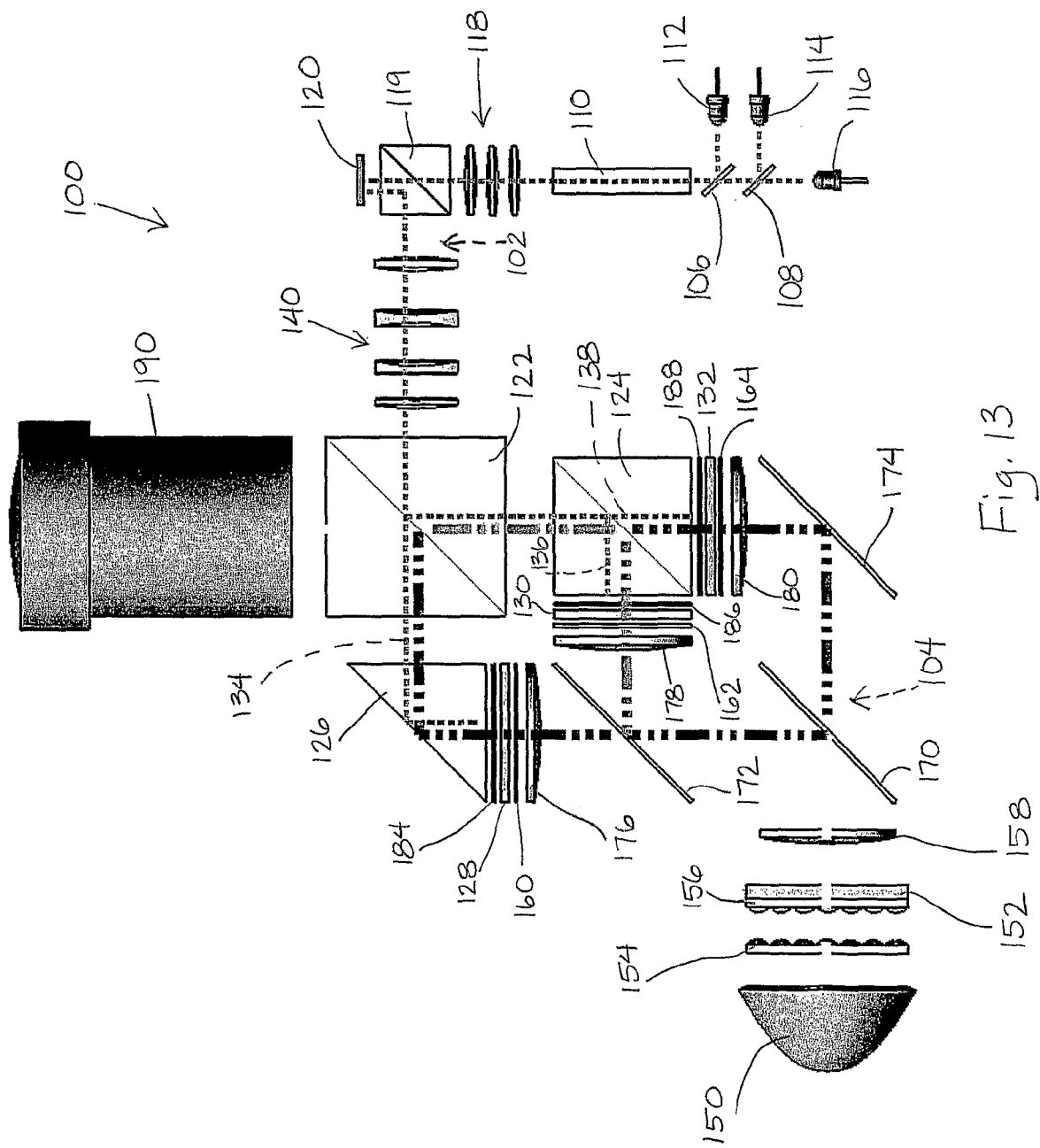

With reference to FIG. 13, a projector light engine 100 defines a write optical path 102 and a read optical path 104. Write optical path 102 is composed of dichroic mirrors 106 and 108 that combine and direct into a tunnel integrator 110 three different peak wavelengths of light emitted from UV LEDs 112, 114, and 116. An example of a set of three narrow-band UV LEDs is 365 nm±10 nm, 385 nm±10 nm, and 405 nm±10 nm. The combined UV light beams propagate through tunnel integrator 110, a relay lens group 118, and a polarizing beam splitter 119 to provide uniform, rectangular illumination that matches the image aspect ratio of an LCOS microdisplay device 120. LCOS device 120 in response to control signals provided by a controller (not shown) is driven color field-sequentially to impart intensity modulation to the UV write light beam for each of the three primary colors (RGB). LCOS device 120 sequentially presents a light pattern of pixel locations that define an image pattern for each color field. Only one of UV LEDs 112, 114, and 116 is switched on at a given time to emit light. Two wavelength-selective, dichroic cube prisms 122 and 124 and one right angle mirrored prism 126 direct the UV write light beam propagating through polarizing beam splitter 119 to SLMs 128, 130, and 132 according to the UV wavelength from the corresponding UV LED. For example, light emitted by UV LED 112 propagates along a color path 134 to SLM 128, light emitted by UV LED 114 propagates along a color path 136 to SLM 130, and light emitted by UV LED 116 propagates along a color path 138 to SLM 132. An individual image corresponding to each color is formed on a different one of SLMs 128, 130, and 132 through an imaging lens group 140. The dichroic coatings in dichroic cube prisms 122 and 124 are designed to transmit or reflect RGB visible light and three narrow bands of UV light of different peak wavelengths, depending on the specific wavelength and location in the optical path. Dichroic coatings within cube prisms 122 and 124 allow only writing image data that are appropriate for the color to reach its corresponding SLM. Since LCOS device 120 cycles through image patterns for each of the three color paths, and only one of UV LEDs 112, 114, and 116 at any one time is turned on to emit light, the image writing data are presented to each SLM for part of the duty cycle. During the remaining part of the duty cycle, the SLM will not be written to, but the liquid crystal material can be allowed to persist in the previous director field configuration until refreshed when the data write cycle repeats. This significantly improves system efficiency.

Read optical path 104 includes an arc lamp 150, which emits randomly polarized white light. The white light propagates through a polarization converter 152, formed as an integral part of an assembly of fly's-eye lenslet arrays 154 and 156, and thereafter through a focusing lens 158 and neutral density linear polarizers 160, 162, and 164 to provide linear polarized light in the form of uniform, rectangular illumination that matches the image aspect ratio of SLMs 128, 130, and 132. A tilted dichroic mirror 170 receives the white light and reflects two of its color light components to a dichroic mirror 172 and transmits a third color component to a tilted mirror 174. Dichroic mirror 172 directs the two color components by transmission and reflection to SLMs 128 and 130, respectively. Tilted mirror 174 directs the third color light component passing through dichroic mirror 170 to SLM 132. Field lenses 176, 178, and 180 associated with the respective SLMs 128, 130, and 132 are used to provide a telecentric illumination condition. Depending on the image defined by the UV write light beams, the three color light components are either transmitted through or absorbed by analyzers 184, 186, and 188 positioned in proximity to the respective SLMs 128, 130, and 132, resulting in intensity modulation of the corresponding color image content. The modulated light beams propagating through SLMs 128, 130, and 132 are combined in dichroic cube prisms 122 and 124 and are directed through a projection lens 190 to generate a color image on a display screen (not shown).

In summary, projector light engine 100 is characterized by use of three narrow-band UV LED sources with different peak wavelengths. Each UV LED source is active for part of the total duty cycle, and an LCOS microdisplay device provides the UV writing image data. Two dichroic cube prisms and one right angle mirrored prism coact to direct the appropriate UV write light patterns onto the correct SLM and recombine the three primary colors of light from the SLMs to form a color image on a display screen through a projection lens. This light engine embodiment has the capability of allowing the previous write state to persist in each SLM until a new duty cycle has begun, resulting in a very high system efficiency.

Figure 14A:
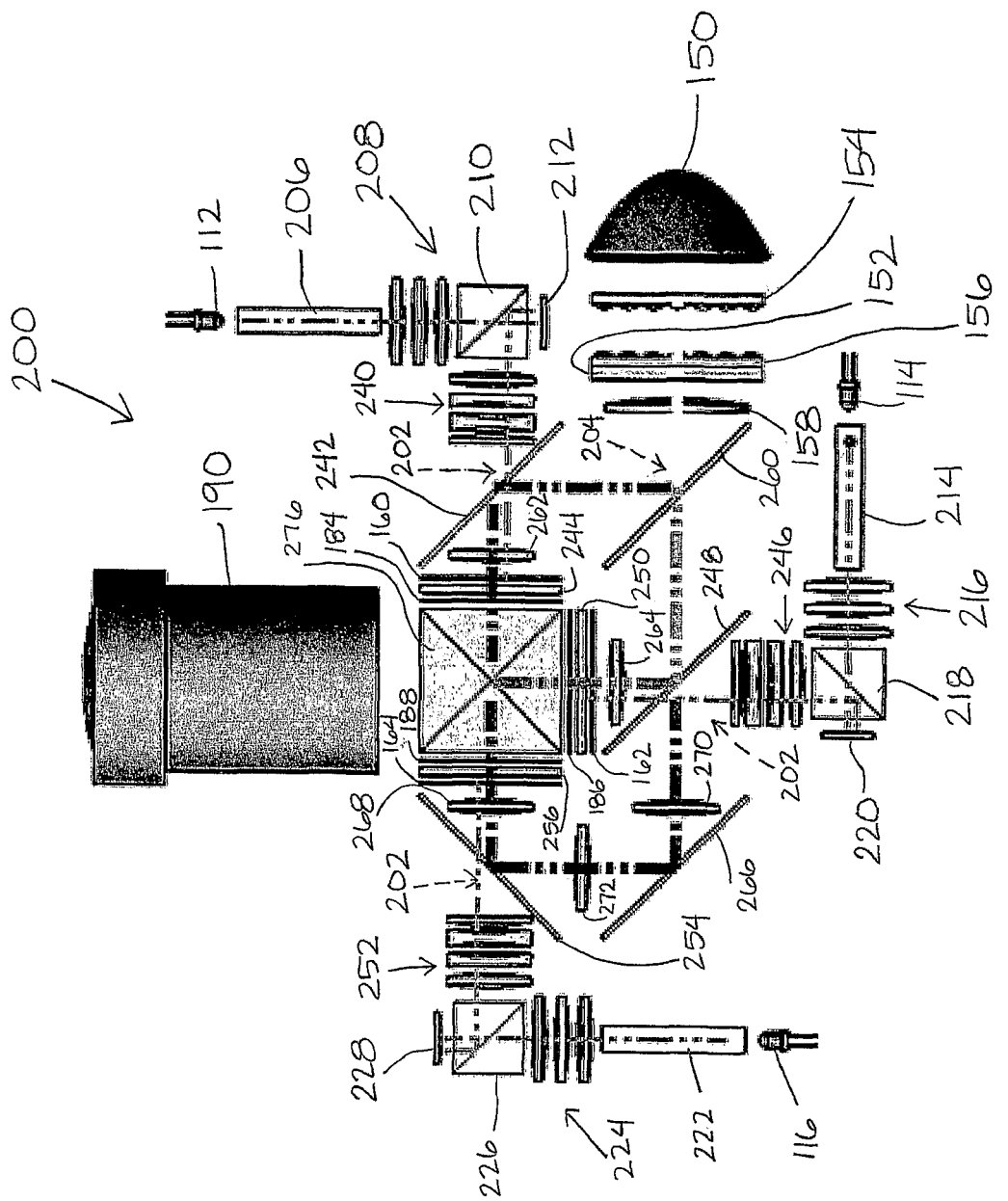

With reference to FIG. 14A, a projector light engine 200 defines a write optical path 202 and a read optical path 204. Write optical path 202 is composed of three segments along each of which propagates a different one of three image definition beams. UV LEDs 112, 114, and 116 provide a source of UV write light beams. The UV beam emitted from UV LED 112 propagates through a tunnel integrator 206, a relay lens group 208, and a polarizing beam splitter 210 to provide uniform, rectangular illumination that matches the image aspect ratio of an LCOS microdisplay device 212. The UV beam emitted from UV LED 114 propagates through a tunnel integrator 214, a relay lens group 216, and a polarizing beam splitter 218 to provide uniform, rectangular illumination that matches the image aspect ratio of an LCOS microdisplay device 220. The UV beam emitted from UV LED 116 propagates through a tunnel integrator 222, a relay lens group 224, and a polarizing beam splitter 226 to provide uniform, rectangular illumination that matches the image aspect ratio of an LCOS microdisplay device 228.

Each of LCOS devices 212, 220, and 228 provides, in response to the UV writing image data, UV write light patterns for a different one of the primary colors (RGB). The UV write light patterns are provided by a controller (not shown) associated with LCOS devices 212, 220, and 228. The UV light beam modulated and reflected by LCOS device 212 is imaged by an imaging lens 240 and propagates through a tilted dichroic mirror 242 for incidence on an SLM 244. The UV light beam modulated and reflected by LCOS device 220 is imaged by an imaging lens 246 and propagates through a tilted dichroic mirror 248 for incidence on an SLM 250. The UV light beam modulated and reflected by LCOS device 228 is imaged by an imaging lens 252 and propagates through a tilted dichroic mirror 254 for incidence on an SLM 256. The modulated UV write light incident on the photoconductor layer of each of SLMs 244, 250, and 256 develops a voltage across its liquid crystal layer. This voltage causes a director field orientation that corresponds to the intensity of the associated incident UV write light beam.

Read optical path 204 includes arc lamp 150, which emits randomly polarized white light. The white light propagates through a polarization converter 152, formed as an integral part of an assembly of fly's-eye lenslet arrays 154 and 156, and thereafter through a focusing lens 158 and neutral density linear polarizers 160, 162, and 164 to provide linearly polarized light in the form of uniform, rectangular illumination that matches the image aspect ratio of SLMs 244, 250, and 256. Tilted dichroic mirror 248 and a tilted dichroic mirror 260 separate the white light into three color light components and cooperate to direct two of them through field lenses 262 and 264 to SLMs 244 and 250, respectively. A tilted mirror 266 directs the third color light component to reflect from dichroic mirror 254 and propagate through a relay lens group, including field lenses 268 and 270 positioned on either side of a relay lens 272, to SLM 256. Depending on the image defined by the UV write light beams, the three color light components are either transmitted through or absorbed by analyzers 184, 186, and 188 positioned in proximity to the respective SLMs 244, 250, and 256, resulting in intensity modulation of the corresponding color image content. The modulated light beams propagating through SLMs 244, 250, and 256 are recombined in an X-cube 276 and directed through projection lens 190 to generate a color image on a display screen (not shown).

In summary, projector light engine 200 is characterized by the use of three LCOS devices for simultaneous generation of writing image data for all three colors. All three SLMs continuously receive appropriate UV write light and visible read light, which gives a duty cycle approaching 100 percent.

Figure 14B:
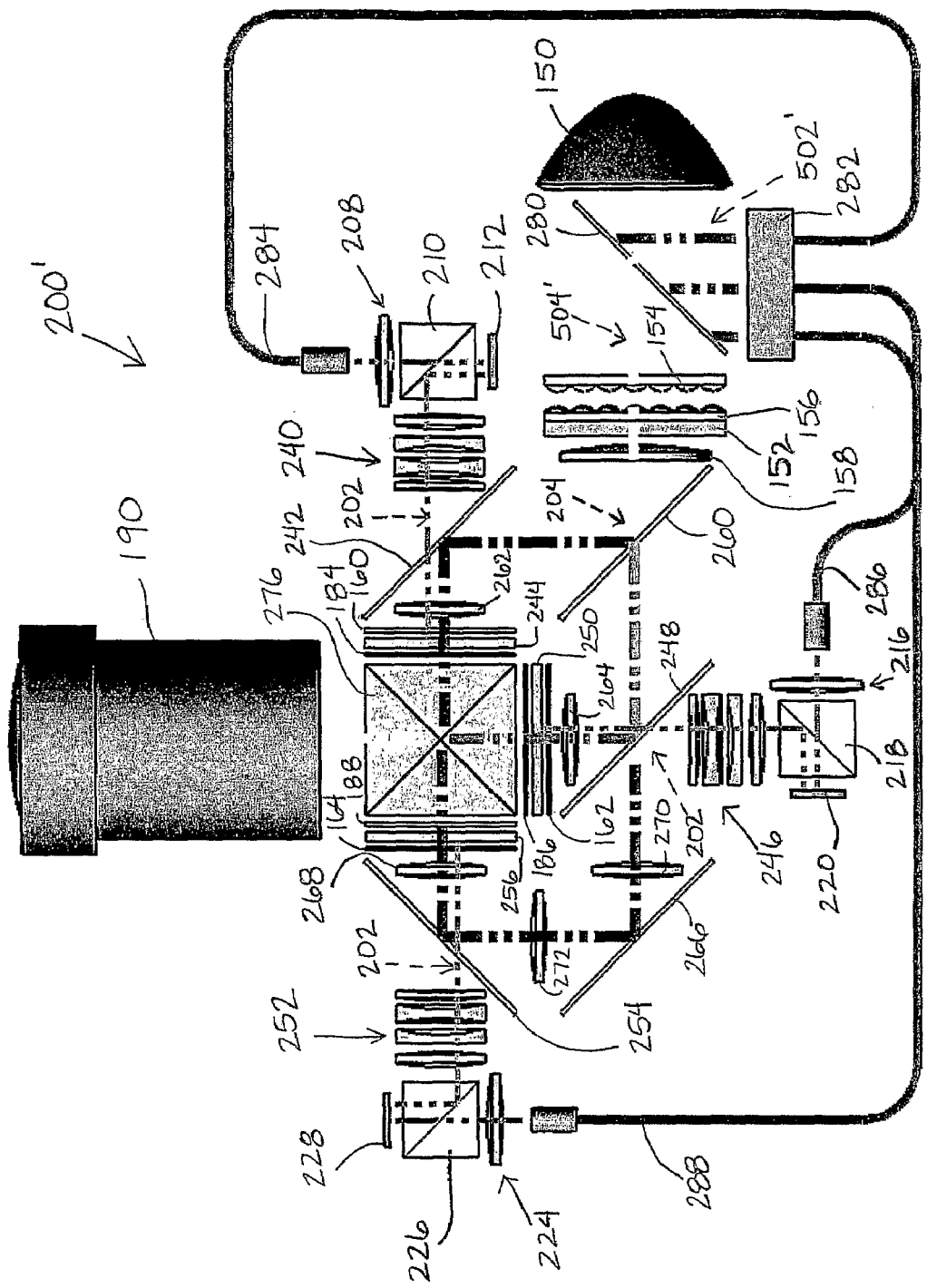

With reference to FIG. 14B, a projector light engine 200' is of very similar design to that of light engine 200 shown in FIG. 14A, except that a write optical path 502' is formed by deriving from arc lamp 150 UV light reflected and collected by a dichroic mirror 280. The UV light propagates through a fiber optic coupling assembly 282 that collects the UV light and filters and separates it into three UV beams. The three light beams propagating from coupling assembly 282 represent the narrow bands of UV light corresponding to those of UV LEDs 112, 114, and 116, which, together with their respective associated tunnel integrators 206, 214, and 222, are eliminated from projector light engine 200'. The UV light beams propagate through fiber optic bundles 284, 286, and 288 that are connected to outputs of coupling assembly 282 and routed for incidence on imaging lenses 208, 216, and 224, respectively.

In summary, projector light engine 200' is characterized by the recovery of UV light from the arc lamp for use as a UV write light source that is distributed through fiber optic bundles to the LCOS devices. The three LCOS devices are used for simultaneous generation of writing image data for all three colors. All three SLMs continuously receive appropriate UV write light and visible read light, which gives a data write cycle approaching 100 percent.

Projector light engine embodiments shown in FIGS. 15, 16, 17A, 17B, 18A, 18B, and 18C use either three independently switchable LED dies and a collimator that form a wide-band UV LED or the UV radiance available from the arc lamp as a UV light source to create image definition light beams.

Figure 15:
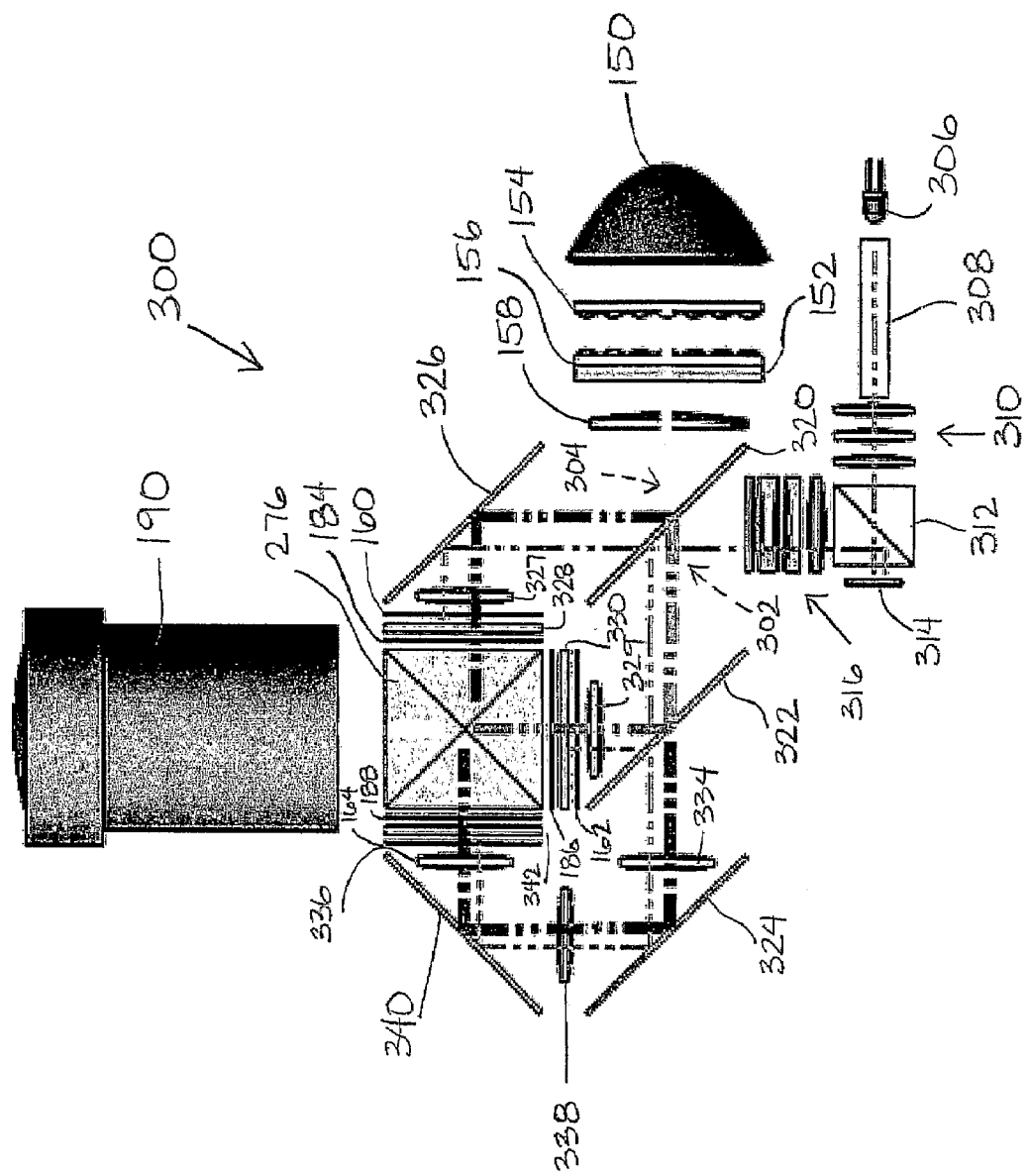

With reference to FIG. 15, a projector light engine 300 defines a write optical path 302 and a read optical path 304. Write optical path 302 is composed of three segments along which propagates a different one of three UV write light beams. A UV light source 306 composed of three independently switchable LED dies and a collimator provides a source of wide-band UV light from which the UV write light beams are derived. Signals are sequentially applied to the LED dies so that only one of them is switched on at a given time to emit light and thereby produce a pulsed UV light beam with three different peak wavelengths. An example of a wide-band UV light source 306 is one that emits UV light in the 360 nm-410 nm range. The UV beam emitted from UV light source 306 propagates through a tunnel integrator 308, an imaging lens 310, and a polarizing beam splitter 312 to provide uniform rectangular UV illumination that matches the image aspect ratio of an LCOS microdisplay device 314. LCOS device 314 is driven color field sequentially to impart intensity modulation to the UV write light beam for each of the three primary colors (RGB) to present light patterns of pixel locations that define an image pattern for each color field. The sequential color field light patterns reflected by LCOS device 314 propagate through polarizing beam splitter 312 and an imaging lens 316. Different portions of the UV light spectrum selectively pass through or reflect off tilted dichroic mirrors 320 and 322 and a tilted mirror 324 to create three path segments of slightly different wavelengths. A first UV wavelength portion passes through dichroic mirror 320, reflects off a mirror 326, and propagates through a field lens 327 for incidence on an SLM 328. A second UV wavelength portion reflects off dichroic mirrors 320 and 322 and propagates through a field lens 329 for incidence on an SLM 330. A third UV wavelength portion reflects off dichroic mirror 320; passes through dichroic mirror 322; propagates through a relay lens group including field lenses 334 and 336 positioned on either side of a relay lens 338; and reflects off mirrors 324 and 340 for incidence on an SLM 342.

Read optical path 304 includes arc lamp 150, which emits randomly polarized white light. The white light propagates through a polarization converter 152, formed as an integral part of an assembly of fly's-eye lenslet arrays 154 and 156, and thereafter through a focusing lens 158 and neutral density linear polarizers 160, 162, and 164 to provide linearly polarized light in the form of uniform rectangular illumination that matches the image aspect ratio of SLMs 328, 330, and 342. Tilted dichroic mirrors 320 and 322 separate the white light into three color light components and cooperate to direct two of them to SLMs 328 and 330. The color light component passing through dichroic mirror 322 propagates through relay lens group lenses 334, 336, and 338 and reflects off of mirrors 324 and 340 before reaching SLM 342. Depending on the image defined by the UV write light beams, the three color light components are either transmitted through or absorbed by analyzers 184, 186, and 188 positioned in proximity to the respective SLMs 328, 330, and 342, resulting in intensity modulation of the corresponding color image content. The modulated light beams propagating through SLMs 328, 330, and 342 are recombined in X-cube 276 and directed through projection lens 190 to generate a color image on a display screen (not shown).

In summary, projector light engine 300 is characterized by use of a wide-band UV light source and an LCOS device that sequentially provides the UV write light beams, with each color field being active for part of the total duty cycle. A series of angled dichroic mirrors act to split the UV write light into three paths of different wavelengths and to split the read light into three color paths that are directed to the three SLMs. A single X-cube recombines the three color paths into a single color image, and a projected color image is created from sequentially projecting images from each of the SLMs.

Figure 16A:
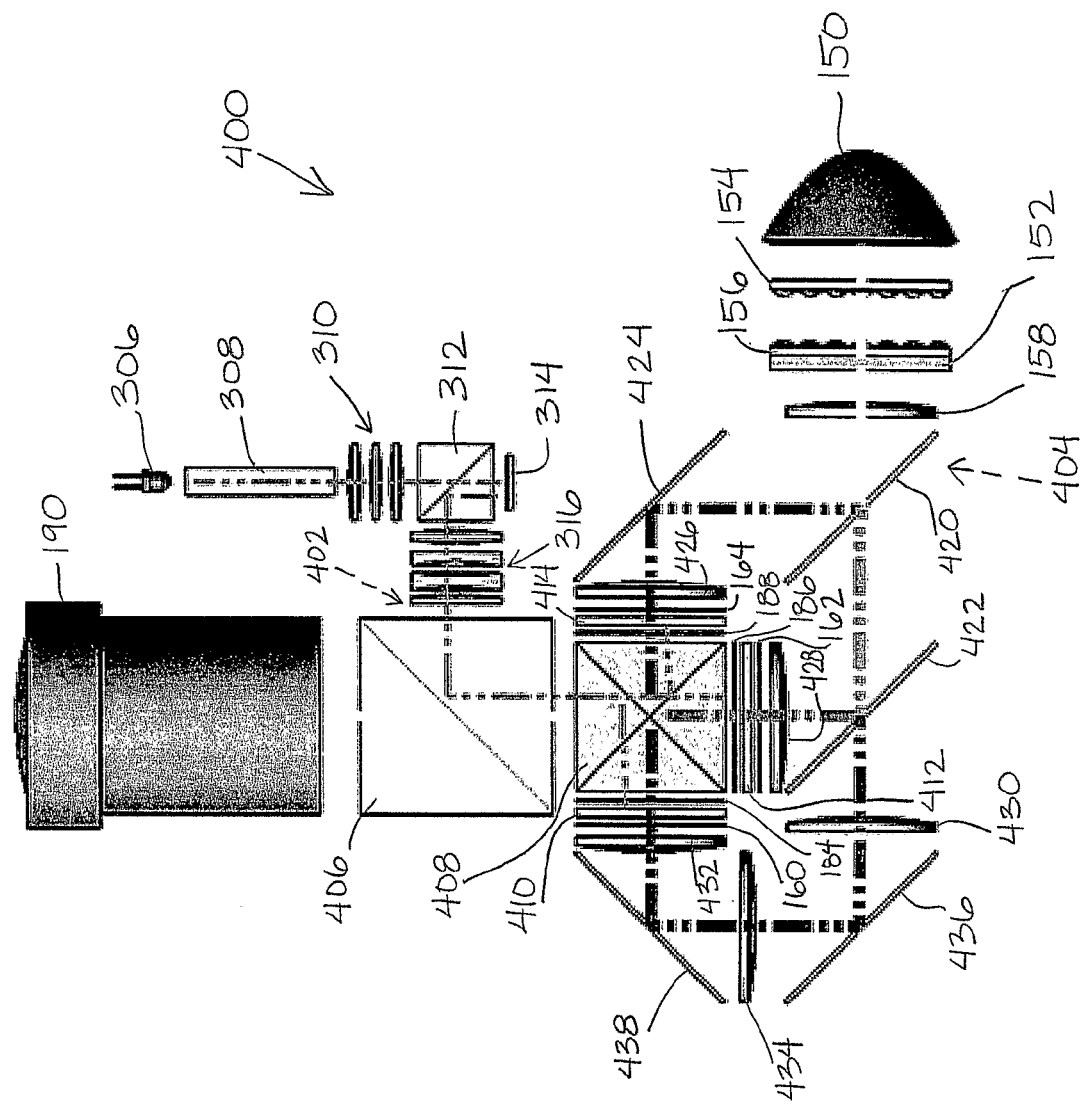

With reference to FIG. 16A, a projector light engine 400 defines a write optical path 402 and a read optical path 404. Write optical path 402 is composed of three segments along which propagates a different one of three UV write light beams. UV light source 306 composed of three independently switchable LED dies and a collimator provides a source of wide-band UV light from which the UV write light beams are derived. Signals are sequentially applied to the LED dies so that only one of them is switched on at a given time to emit light and thereby produce a pulsed UV light beam with three different peak wavelengths. The UV beam emitted from UV light source 306 propagates through tunnel integrator 308, imaging lens 310, and polarizing beam splitter 312 to provide uniform rectangular UV illumination that matches the image aspect ratio of LCOS microdisplay device 314. LCOS device 314 is driven color field sequentially to impart intensity modulation to the UV write light beam for each of the three primary colors (RGB) to present light patterns of pixel locations that define an image pattern for each color field. The sequential color field light patterns reflected by LCOS device 314 propagate through polarizing beam splitter 312 and imaging lens 316 to a dichroic cube 406 positioned immediately upstream of projection lens 190 so that the UV write light is reflected back into an X-cube 408. The dichroic coatings within X-cube 408 separate the UV light spectrum to create three path segments of different wavelengths, each path segment terminating at a different one of SLMs 410, 412, and 414. Since only one LED die of UV light source 306 at any one time is turned on to emit light, the image writing data are presented to each of SLMs 410, 412, and 414 for part of the duty cycle. During the remaining part of the duty cycle, the SLM will not be written to, but the liquid crystal material can be allowed to persist in the previous director field configuration until refreshed when the data write cycle repeats. This significantly improves system efficiency.

Read optical path 404 includes arc lamp 150, which emits randomly polarized white light. The white light propagates through a polarization converter 152, formed as an integral part of an assembly of fly's-eye lenslet arrays 154 and 156, and thereafter through a focusing lens 158 and neutral density linear polarizers 160, 162, and 164 to provide linearly polarized light in the form of uniform rectangular illumination that matches the image aspect ratio of SLMs 410, 412, and 414. Tilted dichroic mirrors 420 and 422 separate the white light into three color light components and cooperate to direct two of them to SLMs 412 and 414. The color light component reflected by dichroic mirror 420 reflects off a mirror 424 and propagates through a field lens 426 before reaching SLM 414. The color light component passing through dichroic mirror 420 and reflecting off dichroic mirror 422 propagates through a field lens 428 before reaching SLM 412. The color light component passing through dichroic mirror 422 propagates through a relay lens group, including field lenses 430 and 432 positioned on either side of a relay lens 434, and reflects off mirrors 436 and 438 before reaching SLM 410. Depending on the image defined by the UV write light beams, the three color light components are either transmitted through or absorbed by analyzers 184, 186, and 188 positioned in proximity to the respective SLMs 410, 412, and 414, resulting in intensity modulation of the corresponding color image content. The modulated light beams propagating through SLMs 410, 412, and 414 are combined in X-cube 408 and directed through dichroic cube 406 and projection lens 190 to generate a color image on a display screen (not shown).

Figure 16B:
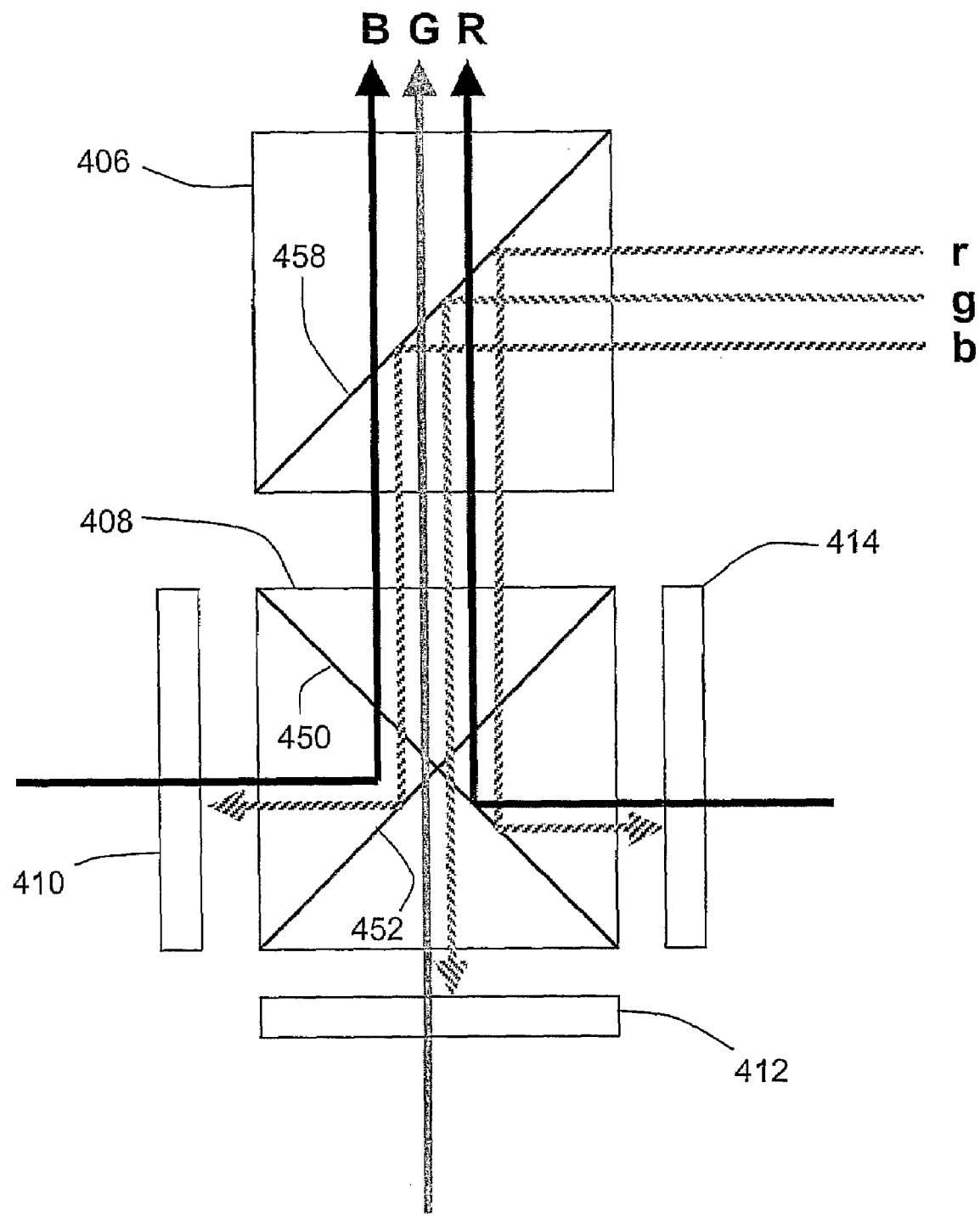
FIGS. 16B and 16C depict, respectively, an optical component subset and a timing diagram showing the operation of the optical engine of FIG. 16A.

The following detailed example explains how the special dichroic coatings within X-cube 408 serve to separate the light paths of the three separate UV wavebands used in write optical path 402 and combine the light paths of the three separate color light components of read optical path 404. With reference to FIG. 16B, the relevant components of FIG. 16A are shown in greater detail, together with the light paths of the three UV components r, g, and b and the three color light components R, G, and B. Two dichroic coatings 450 and 452 in X-cube 408 are designed to separate the three UV write wavebands r, g, and b and direct them to their respective read SLMs 414, 412, and 410 for controlling the red, green, and blue images. At the same time, dichroic coatings 452 and 450 in X-cube 408 also combine the red, green, and blue images in the read optical path. The read light and the write light travel in opposite directions through X-cube coatings 450 and 452.

Figure 16C:
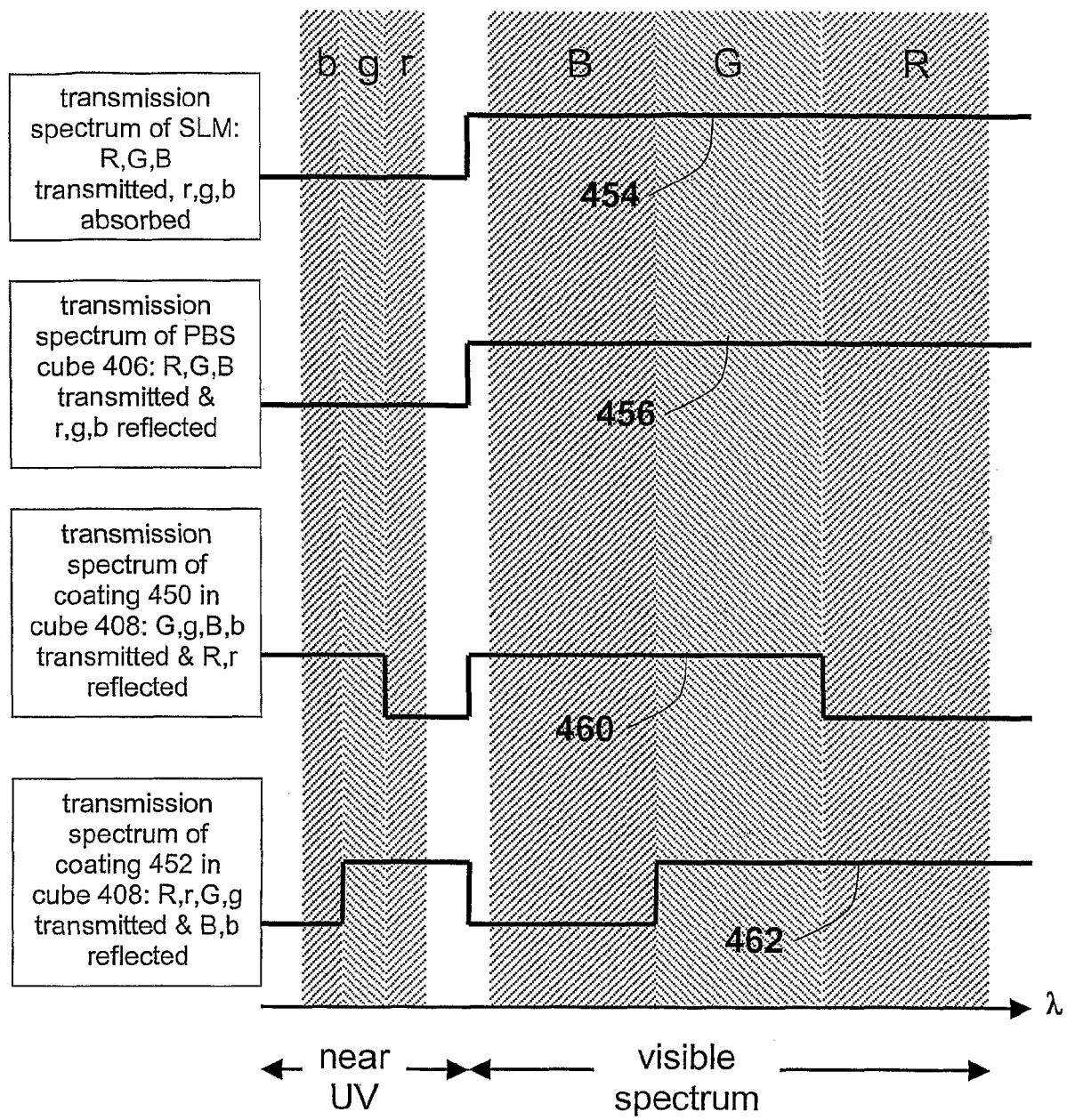

The idealized transmission characteristics of the SLM photoconductor layer, X-cube 408, and dichroic cube 406 are presented in FIG. 16C. Curve 454 shows how the SLM transmits RGB light in the visible spectrum and absorbs rgb light in the near UV, which activates the photoconductor. The three wavelength components in the near UV are called rgb because, as is shown below, r controls R, g controls G, and b controls B. Curve 456 shows the transmission characteristics of dichroic cube 406, a dichroic coating 458 of which transmits the RGB components of the visible read light but reflects the rgb components of the UV write light as shown in FIG. 16B. Curve 460 shows coating 450 in X-cube 408 transmitting GB and gb but reflecting R and r. Curve 462 shows coating 452 in X-cube 408 transmitting RG and rg but reflecting B and b. Beamsplitter dichroic coatings 450 and 452, whose spectra are shown by curves 460 and 462 in FIG. 16C, generate the desired read and write light paths shown in FIGS. 16A and 16B. Or course, other arrangements are possible, such as rearranging the wavelength order of the rgb wavebands. However, the principle of this design remains the same, i.e., the dielectric coatings in X-cube 408 are used to separate the write light wavelength components and combine the read light components that travel in opposite directions.

In summary, projector light engine 400 as characterized by use of a wide-band UV light source and an LCOS device that sequentially provides the UV write light beams, with each color field being active for part of the data write cycle. A dichroic cube positioned between the X-cube and projector lens directs the UV write light back onto the SLMs. The X-cube acts to split the UV write light into three equivalent paths and combine the three color paths into a single color image. A projected color image is created from sequentially projecting images from each of the SLMs.

Figure 17A:
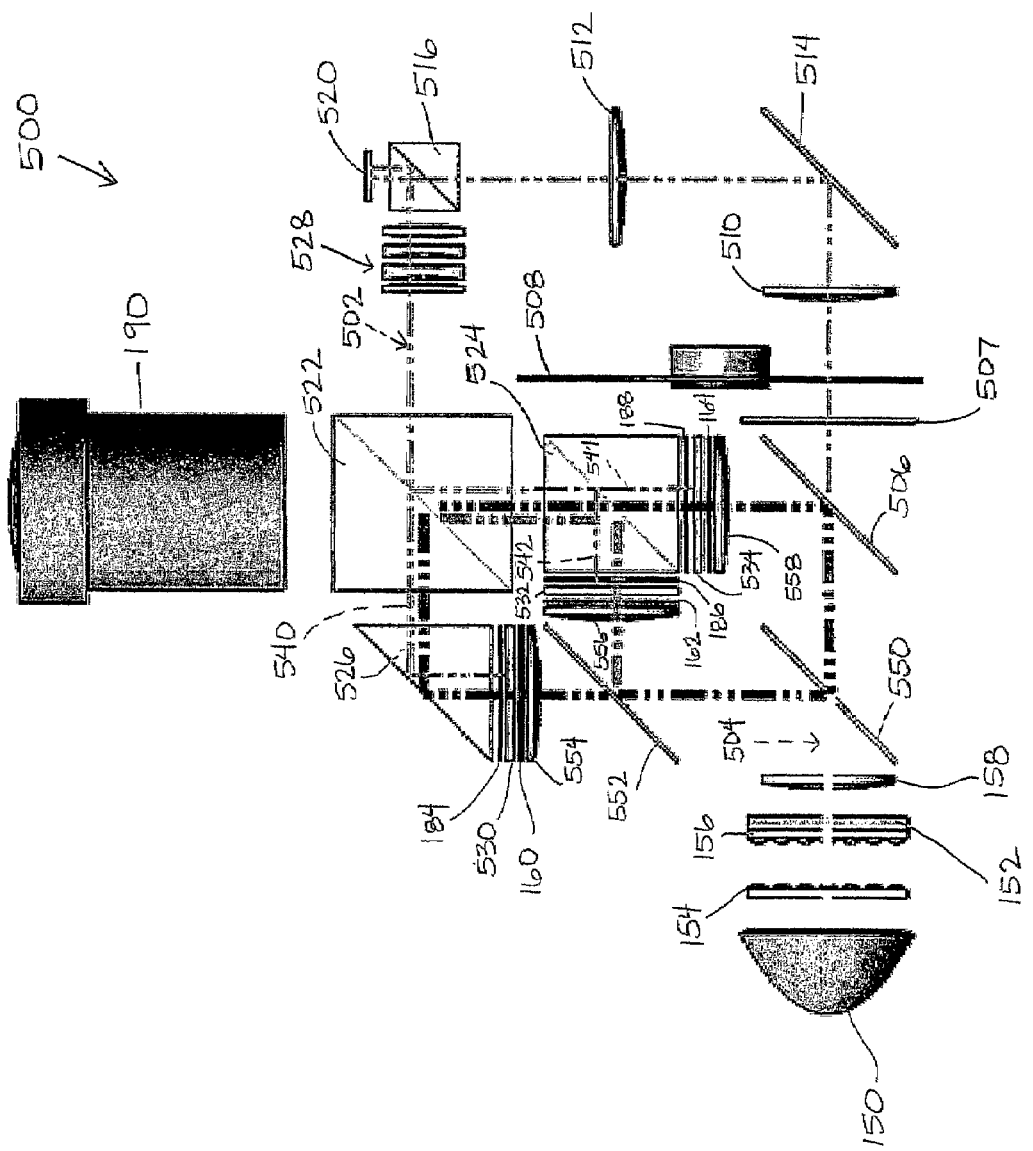

With reference to FIG. 17A, a projector light engine 500 defines a write optical path 502 and a read optical path 504. Write optical path 502 is formed by deriving from arc lamp 150 UV light passing through a dichroic mirror 506 in read optical path 504. The UV light collected by and passing through dichroic mirror 506 propagates through an aperture 507 and a color wheel 508, which separates the UV light sequentially into three narrow bands with different peak wavelengths. Relay lenses 510 and 512 and a mirror 514 direct the UV light passing through color wheel 508 to a polarizing beam splitter 516 to provide uniform, rectangular illumination that matches the image aspect ratio of an LCOS microdisplay device 520. LCOS device 520 sequentially presents a light pattern of pixel locations that define an image pattern for each of the three color fields. Two wavelength-selective, dichroic cube prisms 522 and 524 and one right angle mirrored prism 526 direct the UV writing beam propagating through polarizing beam splitter 516 and an imaging lens 528 to SLMs 530, 532, and 534 according to the UV wavelength passing through the corresponding wavelength selective dichroic filter segment of color wheel 508. For example, light passing through a first dichroic filter segment of color wheel 508 propagates along a color path 540 to SLM 530, light passing through a second dichroic filter segment of color wheel 508 propagates along a color path 542 to SLM 532, and light propagating through a third dichroic filter segment of color wheel 508 propagates along a color path 544 to SLM 534. The dichroic coatings in dichroic cube prisms 522 and 524 are designed to transmit or reflect RGB visible light and three narrow bands of UV light of different peak wavelengths, depending on the specific wavelength and location in the optical path. Dichroic coatings within cube prisms 522 and 524 allow only UV write light that is appropriate for the color to reach its corresponding SLM. Dichroic prisms 522 and 524 cooperate to present appropriate write data images onto each of the SLMs. Image writing data are presented to each SLM for part of the data write cycle. During the remaining part of the data write cycle, the SLM receives no image writing data but the liquid crystal material can be allowed to persist in the previous director field configuration until refreshed when the next data write cycle repeats.

Read optical path 504 includes arc lamp 150, which emits randomly polarized white light. The white light propagates through a polarization converter 152, formed as an integral part of an assembly of fly's-eye lenslet arrays 154 and 156, and thereafter through a focusing lens 158 and neutral density linear polarizers 160, 162, and 164 to provide linearly polarized light in the form of uniform rectangular illumination that matches the image aspect ratio of SLMs 530, 532, and 534. A tilted dichroic mirror 550 receives the white light and reflects two of its color light components to a dichroic mirror 552 and transmits a third color component and a UV component to tilted dichroic mirror 506. Dichroic mirror 552 directs the two color components by transmission and reflection to SLMs 530 and 532, respectively. Dichroic mirror 506 directs the third color and UV light components passing through dichroic mirror 550 to SLM 534 and color wheel 508, respectively. Field lenses 554, 556, and 558 associated with the respective SLMs 530, 532, and 534 are used to provide a telecentric illumination condition. Depending on the image defined by the UV write light beams, the three color light components are either transmitted through or absorbed by analyzers 184, 186, and 188 positioned in proximity to the respective SLMs 530, 532, and 534, resulting in intensity modulation of the corresponding color image content. The modulated light beams propagating through SLMs 530, 532, and 534 are combined in dichroic cube prisms 522 and 524 and are directed through projection lens 190 to generate a color image on a display screen (not shown).

In summary, projector light engine 500 is characterized by the recovery of UV light from the arc lamp for use as the UV write light source. The two dichroic prisms split the UV write light into three UV light paths and combine the three visible color light component (RGB) paths. A color wheel sequentially generates wavelength selective illumination for the image writing data. All SLMs are continuously illuminated with corresponding primary visible light and are sequentially addressed by the UV write light source. During the period when the SLMs are not receiving image writing data, the image can be allowed to persist, thereby giving an almost full effective data write cycle.

Figure 17B:
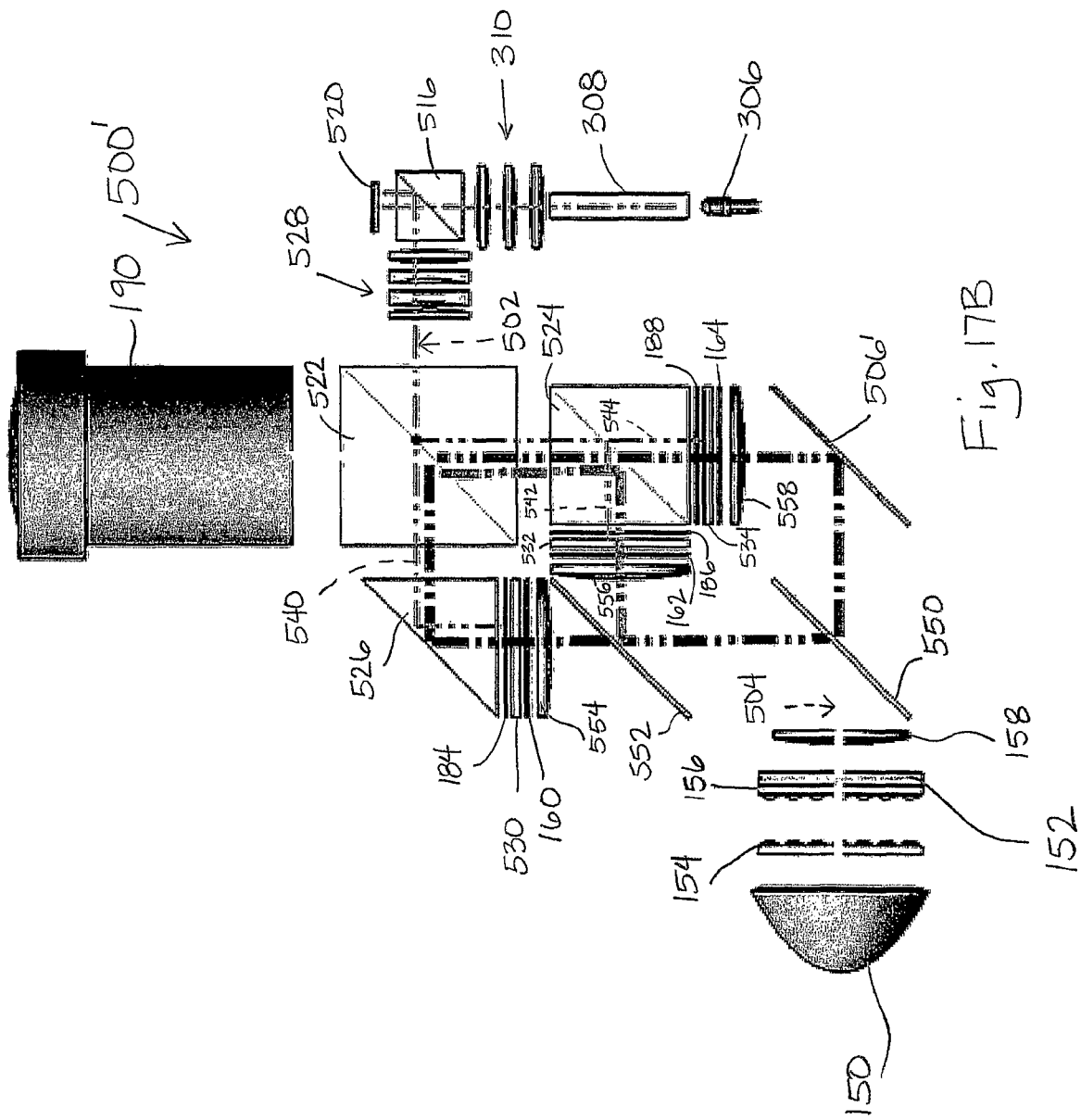

With reference to FIG. 17B, a projector light engine 500' is of very similar design to that of projector light engine 500 shown in FIG. 17A, except that a wide-band UV light source is substituted for color wheel 508, which is eliminated. UV light source 306 composed of three independently switchable LED dies and a collimator provides a source of wide-band UV light from which the UV write light beams are derived. Signals are sequentially applied to the LED dies so that only one of them is switched on at a given time to emit light and thereby produce a pulsed UV light beam with three different peak wavelengths. The UV beam emitted from UV light source 306 propagates through tunnel integrator 308, imaging lens 310, and polarizing beam splitter 516 to provide uniform rectangular UV illumination that matches the image aspect ratio of LCOS microdisplay device 520. LCOS device 520 is driven color field sequentially to impart intensity modulation to the UV write light beam for each of the three primary colors (RGB) to present light patterns of pixel locations that define an image pattern for each color field. The sequential color field light patterns reflected by LCOS device 520 propagate through polarizing beam splitter 516 and imaging lens 528 for incidence on dichroic cube prism 522, as described above with reference to FIG. 17A.

Read optical path 504 is the same as that described above with reference to FIG. 17A, except that a mirror 506' is substituted for dichroic mirror 506.

In summary, projector light engine 500' is characterized by the use of a wide-band UV light source and an LCOS device that sequentially provides the UV write light beams, with each color field being active for part of the data write cycle. The two dichroic prisms split the UV write light into three equivalent light paths and combine the three visible color light component (RGB) paths. All SLMs are continuously illuminated with corresponding primary visible light and are sequentially addressed by the UV write light source, the image data are correct for any SLM for part of the duty cycle. During the period when the SLMs are not receiving image writing data, the image can be allowed to persist, thereby giving an almost full effective data write cycle.

With reference to FIGS. 18A, 18B, and 18C, a projector light engine 600 is configured to have a middle level UV write light path 602 positioned between an upper imaging level 604 and a lower illumination level 606. Lower illumination level 606 includes X-cube or X-oriented dichroic filters 608 that separate white light into three color light component beams (RGB). Upper imaging level 604 includes an X-cube 610 having three side surfaces adjacent to which three SLMs 612, 614, and 616 are positioned. X-cube 610 recombines the three color light component beams propagating through SLMs 612, 614, and 616. A lower set of three fold mirrors 620, 622, and 624; a middle set of three dichroic mirrors 626, 628, and 630 that are transparent to visible light; and an upper set of three fold mirrors 632, 634, and 636 cooperate to reflect the illumination path from lower illumination level 606, through middle level 602, to upper imaging level 604.

UV light source 306 composed of three independently switchable LED dies and a collimator provides a source of wide-band UV light from which the UV write light beams are derived. Signals are sequentially applied to the LED dies so that only one of them is switched on at a given time to emit light and thereby produce a pulsed UV light beam with three different peak wavelengths. The UV beam emitted from UV light source 306 propagates through tunnel integrator 308, imaging lens 310, and polarizing beam splitter 312 to provide uniform rectangular UV illumination that matches the image aspect ratio of LCOS microdisplay device 314 as previously described above for the other projection light engines. After it propagates from LCOS device 314, a UV write light propagates through imaging lens group 316 and a small X-cube 648, which separates the incident UV light beam into three components that propagate along separate paths to SLMs 612, 614, and 616.

Lower illumination level 606 includes a read optical path that includes arc lamp 150, which emits randomly polarized white light. The white light propagates through a polarization converter 152, formed as an integral part of an assembly of fly's-eye lenslet arrays 154 and 156, and thereafter through a focusing lens 158 and neutral density linear polarizers 160, 162, and 164 to provide linearly polarized light in the form of uniform rectangular illumination that matches the image aspect ratio of SLMs 612, 614, and 616. Dichroic mirrors 626, 628, and 630 reflect the UV write light upward while transmitting the visible read light through them. Depending on the image defined by the UV write light beams, the three color light components are either transmitted through or absorbed by analyzers 184, 186, and 188 positioned in proximity to the respective SLMs 612, 614, and 616, resulting in intensity modulation of the corresponding color image component. The modulated light beams propagating through SLMs 612, 614, and 616 are directed through projection lens 190 to generate a color image on a display screen (not shown).

In summary, projector light engine 600 is characterized by the use of a wide-band UV light source and an LCOS device that sequentially provides the UV write light beams, with each color field being active for part of the data write cycle. An X-cube or X-oriented dichroic filters split the UV write light into three equivalent paths for incidence on different ones of the three SLMs. An X-oriented dichroic filter splits the visible light into three color light component paths, and an X-cube recombines the three color light paths into a single color image after passing through the SLMs. Light carrying the color image is directed through projection lens 190. All of the SLMs are continuously illuminated with visible read light, and each of them is addressed by the corresponding wide-band UV light source for part of the data write cycle, as described above for other projector light engines.

It will be obvious to those having skill in the art that many changes may be made to the details of the above-described embodiments without departing from the underlying principles of the invention. For example, projector light engines can be configured with SLMs of the present invention to transmit light in more than three colors. The scope of the present invention should, therefore, be determined only by the following claims.

The invention claimed is:

1. A transmissive, photoconductive optically addressed spatial light modulator comprising:
   first and second optically transparent electrode structures;
   a photoconductive material structure and an electro-optic light modulating structure included between the first and second electrode structures, the photoconductive material structure at its operating temperature being responsive to a first wavelength and flux range of light and substantially nonresponsive to a second wavelength and flux range of light, the first and second wavelength ranges being different from each other and the flux of the second flux range of light being substantially larger than the first flux range of light;
   the photoconductive material structure has a variation of composition such that photoexcited election- and hole-charge carriers generated by light within the first wavelength and flux range of light do not exit from the light modulator to any substantial extent; and
   local variations of polarization of the photoconductive material structure resulting from local variations in the quantity of light within the first wavelength and flux range of light subject to an electric field produced by an externally applied AC bias potential across the two electrode structures cause local variations of a voltage developing across the electro-optic light modulating structure sufficient to produce local variation of an optical property of at least some electro-optic material within the electro-optic light modulating structure to the extent an optical property of light within the second wavelength and flux range of light is modulated locally as it passes through the entire structure of the two electrode structures, the photoconductive material structure, and the electro-optic light modulating structure;
   in which the electro-optic light modulating structure contains a layer of liquid crystal type material;

in which the electro-optic light modulating structure further comprises opposed surface alignment layers between which the liquid crystal material layer is contained, the surface alignment layers conditioned to produce substantially homeotropically aligned directors within the liquid crystal material in the absence of an electric field.

2. The light modulator of claim 1, in which the photoconductive structure includes an absorption layer wherein most of the light within the first range of light is absorbed and a charge transport layer wherein photoexcited electrons and holes generated in the absorption layer drift back and forth in response to the externally applied AC bias across the two electrode structures.

3. The light modulator of claim 2, in which the carrier transport layer is thicker than the absorption layer.

4. The light modulator of claim 1, in which the liquid crystal type material is a nematic liquid crystal type material.

5. The light modulator of claim 1, further comprising an electrically insulating dielectric layer between the photoconductive region and the alignment layer on the photoconductive side of the electro-optic light modulator structure.

6. The light modulator of claim 1, further comprising an electrically insulating amorphous planar region positioned between the photoconductive region and the alignment layer on the photoconductive side of the electro-optic light modulator structure.

7. The light modulator of claim 6 in which the electrically insulating amorphous region is composed of material selected from a group including $SiO_2$, $Al_2O_3$, and silicon-oxi-nitride.

8. The light modulator of claim 1, in which the second wavelength range of light includes no wavelengths that are as short as the predominance of the first wavelength range of liquid.

9. The light modulator of claim 1, in which the first wavelength range of light is generally shorter than the second wavelength range of light and that the flux weighted overlap of the two ranges is less than 0.1%.

10. The light modulator of claim 9, in which the second wavelength range of light substantially spans the visible spectrum and the first wavelength range of light is substantially confined within the ultraviolet region of the spectrum.

11. The light modulator of claim 1, in which the light of the first wavelength and flux range carries a pattern of intensity that causes a corresponding pattern of voltage differences across the electro-optic light modulating structure even while a much larger uniform flux of light within the second wavelength and flux range passes through the entire light modulator.

12. The light modulator of claim 1, in which the first electrode structure comprises a substrate layer of crystalline sapphire, a nucleation and a buffer planar region, and a substantially single crystalline planar region of GaN or of AlGaN alloy that is doped with donor material in sufficient concentration to enable effective electrode function.

13. The light modulator of claim 12, in which the first electrode structure further comprises an electrically isolating planar barrier region situated between the electrically conductive region of the electrode structure and the photoconductive structure and including a substantially single crystalline $Al_zGa_{1-z}N$ alloy having an Al concentration exceeding that of the materials on its major surfaces.

14. The light modulator of claim 13, in which the electrically isolating planar barrier region is characterized by an alloying parameter, z, having a value that varies depthwise within the planar barrier region so as to suppress internal photoemission of electrons and of holes across it.

15. The light modulator of claim 14, in which the value of the alloying parameter, z, changes in accordance with a profile that increases monotonically over at least about 4 times the electron scattering length within this material under operating conditions (temperature) of the projection display device, remains approximately constant for at least about 8 times the electron scattering length, and decreases monotonically over at least about 4 times the electron scattering length.

16. The light modulator of claim 12, in which the photoconductive material structure includes a substantially single crystalline photoconductive planar region of a doped alloy of GaN that is epitaxial with the first electrode structure.

17. The light modulator of claim 16, in which the photoconductive planar region has a thickness and a doping chosen to obtain substantially complete depletion of the photoconductive planar region by the first electrode structure in the absence of incidence of light within the first wavelength and flux range.

18. The light modulator of claim 12, in which the photoconductive material structure includes a substantially single crystalline photoconductive planar region of a not-intentionally doped alloy of GaN that is epitaxial with the first electrode structure.

19. The light modulator of claim 1, in which the first electrode structure comprises an amorphous window support layer of a glass material and a transparent conductor selected from a group including amorphous indium tin oxide (ITO), and n+ZnO:Al, the transparent conductor having a conductivity and thickness combination sufficient to provide effective electrode function.

20. The light modulator of claim 19, in which the first electrode structure further comprises an electrically insulating barrier planar region on the major surface whereto the photoconductive material structure joins of thickness between 20 nm and 500 nm having a composition selected from a group including polyimide, $SiO_2$, $Al_2O_3$, and silicon-oxi-nitride.

21. The light modulator of claim 19, in which the photoconductive material structure includes a photoconductive planar region of microcrystalline material containing ZnO and has a thickness between about 0.7 μm and about 6 μm.

22. The light modulator of claim 21, in which at least some of the ZnO containing photoconductive material is an alloy of $(ZnO)_x(Ga_2O_3)_y(In_2O_3)_z$, such that $x+y+z=1$.

23. The light modulator of claim 1, in which each of the liquid crystal layer and the photoconductive material structure has a capacitance, and in which the capacitance of the liquid crystal layer is substantially one-half or larger than the capacitance of the photoconductive material structure.

24. The light modulator of claim 23, in which the liquid crystal layer in an nonfield aligned state has a dielectric constant equal to or greater than about 6.0.

25. The light modulator of claim 24, in which the liquid crystal layer has positive dielectric anisotropy and $\epsilon_\perp$ equal to or greater than about 6.0.

26. The light modulator of claim 24, in which the liquid crystal layer has negative dielectric anisotropy and $\epsilon_\parallel$ equal to or greater than about 6.0.

27. The light modulator of claim 23, in which the liquid crystal layer has a $V_{min}$ equal to or greater than about 4.0 volts.

28. The light modulator of claim 23, in which the liquid crystal layer has an optical thickness that is greater than about one-half wavelength of light.

29. A transmissive, optically addressed, photoconductive spatial light modulator, comprising:

first and second optically transparent electrode structures;

a photoconductive material structure and an electro-optic material structure included between the first and second electrode structures, the photoconductive material structure responsive to a first wavelength range of light and substantially nonresponsive to a second wavelength range of light, the first and second wavelength ranges being different from each other;

the photoconductive material structure including multiple layers of semiconductor materials, a first one of the layers being responsive to the first wavelength range of light by strongly absorbing it and each remaining layer of the multiple layers being substantially nonresponsive to the first wavelength range of light by weakly absorbing it, and a second one of the multiple layers being an electrically isolating barrier layer; and light of the first wavelength range incident on the photoconductive material structure causing a voltage to change across the electro-optic layer and thereby produce a corresponding change in value of an optical property of the electro-optic material layer, the change in value of the optical property modulating incident light of the second wavelength range propagating through the electro-optic material layer;

in which the electro-optic light modulating structure contains a layer of liquid crystal type material;

further comprising opposed surface alignment layers between which the liquid crystal material layer is positioned, the surface alignment layers conditioned to produce substantially homeotropically aligned directors in the absence of an electric field.

30. The light modulator of claim 29, in which the first electrode structure includes a first electrode layer and a third one of the multiple layers of semiconductor materials is a carrier transport layer, and the electrically isolating barrier layer is positioned between the first electrode layer and the carrier transport layer.

31. The light modulator of claim 30, in which the carrier transport layer is thicker than the strongly absorbing layer.

32. The light modulator of claim 29, in which the liquid crystal material is not a ferroelectric type liquid crystal.

33. The light modulator of claim 29, in which the liquid crystal material is a nematic type liquid crystal.

34. The light modulator of claim 29, further comprising an electrically insulating dielectric layer situated between the photoconductive layer and the alignment layer proximally actuated to the photoconductive material structure.

35. The light modulator of claim 29, further comprising an electrically insulating amorphous planar region positioned between the photoconductive region and an alignment layer proximally situated to the photoconductive material structure.

36. The light modulator of claim 35, in which the electrically insulating amorphous region is selected from a group including $SiO_2$, $Al_2O_3$, or silicon-oxy-nitride.

37. The light modulator of claim 29, in which the first wavelength range of light includes wavelengths that are shorter than the wavelengths in the second wavelength range.

38. The light modulator of claim 37, in which the first wavelength range is of ultraviolet light and the second wavelength range is of visible light.

39. The light modulator of claim 29, in which the light of the first wavelength range incident on the photoconductive material structure carries a light pattern that causes the voltage to change in a corresponding pattern of voltage drops across the electro-optic layer.

40. The light modulator of claim 29, in which the first electrode structure comprises multiple regions including a substrate layer of crystalline sapphire; a nucleation and buffer planar region; and a substantially single crystalline planar region of GaN or of AlGaN alloy that is doped with donor material in sufficient concentration to enable effective electrode function.

41. The light modulator of claim 40, in which the first electrode structure further comprises an electrically isolating planar barrier region situated between the electrically conductive region of the electrode structure and the photoconductive material structure, the barrier layer including major surfaces and substantially single crystalline AlGaN having an Al concentration exceeding that of materials on its major surfaces.

42. The light modulator of claim 41, in which the electrically isolating planar barrier region is characterized by an alloying parameter, z, having a value that varies depthwise within the planar barrier region to suppress photoemission of elections and holes across it.

43. The light modulator of claim 42, in which the planar barrier region includes first, second, and third planar portions, and in which the value of alloying parameter z changes in accordance with a profile that increases monotonically over the first portion, remains approximately constant over the second portion, and decreases monotonically over the third portion.

44. The light modulator of claim 40, in which the photoconductive material structure includes a substantially crystalline photoconductive planar region of a doped alloy of GaN that is epitaxial with the first electrode structure.

45. The light modulator of claim 44, in which the photoconductive planar region has a thickness and a doping chosen to obtain substantially complete depletion of the photoconductive planar region by the first electrode structure in the absence of incidence of light in the first wavelength range.

46. The light modulator of claim 40, in which the photoconductive material structure includes a substantially crystalline photoconductive layer of a not-intentionally doped alloy of GaN that is epitaxial to the first electrode structure.

47. The light modulator of claim 29, in which the first electrode structure comprises an amorphous window support layer of a glass material and a transparent conductor selected from a group including amorphous indium tin oxide, ITO, or microcrystalline n-type ZnO:Al, the transparent conductor having a conductivity and thickness combination sufficient to provide effective electrode function.

48. The light modulator of claim 47, in which the first electrode structure further comprises an electrically isolating barrier planar region having a major surface situated adjacent the photoconductive material structure, the planar barrier region being of thickness between 20 nm and 500 nm and of a composition selected from a group including polyimide, $SiO_2$, $Al_2O_3$, or silicon-oxy-nitride.

49. The light modulator of claim 47, in which the photoconductive material structure includes a photoconductive planar region of microcrystalline material containing ZnO and has a thickness of between about 0.7 μm and about 6 μm.

50. The light modulator of claim 47, in which at least some of the ZnO containing photoconductive planar region is an alloy of $(ZnO)_x(Ga_2O_3)_y(In_2O_3)_z$, such that $x+y+z=1$.

51. The light modulator of claim 45, in which the composition of the photoconductive device structure varies gradually with depth from one with an electrically conducting electrode layer character to one with an insulating character irrespective of whether write light is present and to one with a character that is photoconducting in the presence of write light but insulating in the absence of the write light irrespective of whether read light is present.

52. The light modulator of claim 44, in which the composition of the photoconductive planar region varies gradually with depth between a composition having a bandgap greater than that corresponding to the photon energy of incident write light and a composition having a bandgap less than that corresponding to the photon energy of incident write light.

53. The light modulator of claim 47, in which the photoconductive planar region is an amorphous semiconductor selected from a group including hydrogenated amorphous silicon carbide alloys, a-SiC$_x$:H, with $0.2<x<0.55$.

54. The light modulator of claim 47, in which the photoconductive material structure comprises two portions of polycrystalline material between which the electro-optic material layer is positioned.

55. The light modulator of claim 54, in which, each of the two portions is an alloy of $(ZnO)_x(Ga_2O_3)_y(In_2O_3)z$, such that $x+y+z=1$, with a thickness of greater than about 0.3 μm.

56. The light modulator claim 48, in which the composition of the photoconductive device structure varies gradually with depth from one with an electrically conducting electrode layer character to one with an insulating character irrespective of whether write light is present and to one with a character that is photoconducting in the presence of write light but insulating in the absence of the write light irrespective of whether read light is present.

57. The light modulator of claim 48, in which the compositions of the two photoconductive planar regions vary gradually with depth between a composition having a bandgap greater than that corresponding to the photon energy of incident write light and a composition having a bandgap less than that corresponding to the photon energy of incident write light.

58. The light modulator of claim 54, in which the photoconductive structure comprises two layers of amorphous semiconductor material that are selected from a group including hydrogenated amorphous silicon carbide alloy, or a-SiC$_x$:H, with $0.2<x<0.55$, are positioned on both sides of the electro-optic material layer, and adjusted to absorb approximately equal amounts of incident light in the first wavelength range.

59. An optically addressed projection display system operating in multiple-color transmission mode, comprising:
  multiple optically addressed spatial light modulating read valves, each of which including a photoconductive material structure and an associated electro-optic material layer;
  pattern definition light in a first wavelength range carrying light pattern information and directed for incidence on the read valves, the photoconductive material structure of each of the multiple read valves responding to the light pattern information of the incident pattern definition light by contributing to establishment of corresponding values of a property of the electro-optic material layer associated with the photoconductive material structure;
  a read light source of illumination light in a second wavelength range included in the visible spectrum, the second wavelength range including wavelengths that are longer than wavelengths in the first wavelength range, and the illumination light propagating through the electro-optic material layer of each of the read valves and undergoing modulation in response to the established values of the property of the electro-optic material layer to form modulated illumination light transmitted through the read valve; and
  an optical element through which propagates the modulated illumination light transmitted through the multiple read valves;
  in which the associated electro-optic material layer contains a layer of liquid crystal type material;
  in which the associated electro-optic material layer structure further comprises opposed surface alignment layers between which the liquid crystal material layer is contained, the surface alignment layers conditioned to produce substantially homeotropically aligned directors within the liquid crystal material in the absence of an electric field.

60. The display system of claim 59, further comprising a controller operatively associated with one or more write valves to provide for field sequential incidence of the pattern definition light on the multiple read valves, each of the read valves storing the light pattern information carried by the incident pattern definition light and transmitting the modulated illumination light, the stored light pattern information persisting until the light pattern carried by the incident pattern definition light changes.

61. The display system of claim 60, in which the pattern definition light propagates from a single light source, and each of the multiple read valves receives a different wavelength band of pattern definition light.

62. The display system of claim 60, in which the pattern definition light propagates from multiple write valves each illuminated by a different light source.

63. The display system of claim 59, in which the pattern definition light propagates from multiple light sources, the light sources including different light-emitting diodes of which at least one emits light in the ultraviolet spectral range.

64. The display system of claim 63, in which the light-emitting diodes reside in a common package.

65. The display system of claim 59, in which the pattern definition light propagates from a write valve illuminated by multiple light sources.

66. The display system of claim 65, in which the multiple light sources include light-emitting diodes emitting separate light beams, and further comprising multiple dichroic optical devices arranged to combine the separate light beams to co-propagate as a coaxial beam for incidence on the write valve.

67. The display system of claim 66, in which the multiple dichroic optical devices are arranged in a beam splitter configuration.

68. The display system of claim 59, further comprising a source of broad spectrum light incident on a rotatable color wheel having three or more wavelength band filters, each of which associated with a different one of the multiple read valves to provide the pattern definition light, and at least one of the wavelength band filters passing a wavelength band within the ultraviolet spectral region.

69. The display system of claim 59, further comprising a source of broad spectrum light incident on an electronically switchable color filter producing light in selectable multiple colors, each of which associated with a different one of the multiple read valves to provide the pattern definition light, and light in at least one of the selectable multiple colors being in a wavelength band in the ultraviolet spectral region.

70. The display system of claim 59, in which the pattern definition light propagates from one or more write valves selected from a group including a reflective liquid crystal on silicon (LCoS) device, a thin film transistor liquid crystal display (LCD) device a polysilicon transmissive LCD device, an inorganic light-emitting diode (LED) array, an organic LED array, a digital mirror device, a cathode-ray tube with phosphor extending into the ultraviolet (UVCRT), a field effect display (FED) device, or a plasma device.

71. The display system of claim 59, in which the pattern definition light includes multiple wavelength bands and the illumination light includes multiple wavelength bands that differ from the wavelength bands of the pattern definition light, and further comprising multiple dichroic beamsplitter coatings on which the pattern definition light and the illumination light are incident, the beamsplitter coatings cooperating to separate the multiple wavelength bands of the incident pattern light and to combine the multiple wavelength bands of the incident illumination light.

72. The display system of claim 71, in which the pattern definition light and the illumination light propagate in opposite directions when incident on the dichroic beamsplitter coatings.

73. The light modulator of claim 1, in which the liquid crystal material is not a ferroelectric type liquid crystal.

* * * * *